(12) United States Patent
Blankenship et al.

(10) Patent No.: US 10,959,189 B2
(45) Date of Patent: Mar. 23, 2021

(54) UPLINK POWER SHARING IN DUAL CONNECTIVITY

(71) Applicant: Telefonaktiebolaget L M Ericsson (publ), Stockholm (SE)

(72) Inventors: Yufei Blankenship, Kildeer, IL (US); Daniel Larsson, Vallentuna (SE); Xinghua Song, Beijing (CN)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 804 days.

(21) Appl. No.: 14/758,734

(22) PCT Filed: Mar. 19, 2015

(86) PCT No.: PCT/IB2015/052035
§ 371 (c)(1),
(2) Date: Jun. 30, 2015

(87) PCT Pub. No.: WO2015/140758
PCT Pub. Date: Sep. 24, 2015

(65) Prior Publication Data
US 2016/0255593 A1    Sep. 1, 2016

(30) Foreign Application Priority Data

Mar. 19, 2014    (WO) ............... PCT/CN2014/073678

(51) Int. Cl.
*H04W 52/34*        (2009.01)
*H04W 52/14*        (2009.01)
(Continued)

(52) U.S. Cl.
CPC ............. *H04W 52/34* (2013.01); *H04J 11/00* (2013.01); *H04L 1/1812* (2013.01);
(Continued)

(58) Field of Classification Search
CPC ..................... H04W 52/146; H04W 52/34
(Continued)

(56) References Cited

U.S. PATENT DOCUMENTS

2013/0114505 A1    5/2013    Haim et al.
2013/0176953 A1    7/2013    Stern-Berkowitz et al.
(Continued)

FOREIGN PATENT DOCUMENTS

CN    101034931 A    9/2007
CN    103167594 A    6/2013
(Continued)

OTHER PUBLICATIONS (3GPP TSG-RAN WG2 meeting #85 ;Prague, Czech Republic, Feb. 10-14, 2014; R2-140501; Qualcomm Incorporated; UE maximum power and power headroom considerations in dual connectivity).*
(Continued)

*Primary Examiner* — Kodzovi Acolatse
*Assistant Examiner* — Abdeltif Ajid
(74) *Attorney, Agent, or Firm* — Withrow & Terranova, PLLC

(57) ABSTRACT

Systems and methods enabling uplink power sharing for dual connectivity are disclosed. Embodiments are described herein in which a maximum Uplink (UL) power on each link is configured statically, semi-statically, or dynamically. In general, regardless of the embodiment, uplink power for uplink transmissions from a wireless device on two simultaneous links is controlled such that the total uplink power does not exceeds a maximum UL transmission power level while, in some embodiments, taking into account priorities of the two links and/or priorities of various uplink channels transmitted by the wireless device on the two links. Notably, while the embodiments described herein focus on dual connectivity, the embodiments described herein can easily
(Continued)

MeNB

SeNB be extended to any number of two or more simultaneous links.

15 Claims, 25 Drawing Sheets

(51) Int. Cl.
    *H04W 52/30*     (2009.01)
    *H04W 52/28*     (2009.01)
    *H04J 11/00*     (2006.01)
    *H04L 1/18*     (2006.01)
    *H04L 5/00*     (2006.01)

(52) U.S. Cl.
    CPC ............ *H04L 5/0003* (2013.01); *H04L 5/005* (2013.01); *H04W 52/146* (2013.01); *H04W 52/281* (2013.01); *H04W 52/30* (2013.01)

(58) Field of Classification Search
    USPC ........................................................ 370/328
    See application file for complete search history.

(56) References Cited

U.S. PATENT DOCUMENTS

| | | | |
|---|---|---|---|
| 2013/0272231 A1 | 10/2013 | Dinan | |
| 2014/0050205 A1* | 2/2014 | Ahn .................... | H04B 17/318 370/336 |
| 2014/0056278 A1* | 2/2014 | Marinier ............. | H04W 72/044 370/330 |
| 2014/0133449 A1* | 5/2014 | Xu ...................... | H04W 52/346 370/329 |
| 2015/0201383 A1* | 7/2015 | Papasakellariou .. | H04W 52/146 370/278 |
| 2016/0198421 A1* | 7/2016 | Yi ....................... | H04W 52/365 370/329 |
| 2016/0205632 A1* | 7/2016 | Yi ....................... | H04W 52/146 455/522 |
| 2016/0330693 A1* | 11/2016 | Hwang ................ | H04W 52/146 |
| 2017/0013564 A1* | 1/2017 | Yi ........................ | H04W 52/36 |

FOREIGN PATENT DOCUMENTS

| | | |
|---|---|---|
| CN | 103220768 A | 7/2013 |
| JP | 2012516608 A | 7/2012 |
| WO | 2013025562 A2 | 2/2013 |
| WO | 2013115510 A1 | 8/2013 |

OTHER PUBLICATIONS (3GPP TSG-RAN WG2 meeting #85).*
(3GPP TSG RAN WG1 Meeting #76; Prague, Czech Republic, Feb. 10-14, 2014; Fujitsu; Power allocation strategy for power limited UEs in dual-connectivity).*
Written Opinion for International Patent Application No. PCT/IB2015/052035, dated Mar. 17, 2016, 9 pages.
Author Unknown, "Technical Specification Group Radio Access Network; Evolved Universal Terrestrial Radio Access (E-UTRA); User Equipment (UE) radio transmission and reception (Release 12)," Technical Specification 36.101, Version 12.2.0, 3GPP Organizational Partners, Dec. 2013, 507 pages.
Author Unknown, "Technical Specification Group Radio Access Network; Evolved Universal Terrestrial Radio Access (E-UTRA); User Equipment (UE) radio transmission and reception (Release 12)," Technical Specification 36.101, Version 12.6.0, 3GPP Organizational Partners, Dec. 2014, 589 pages.
Author Unknown, "Technical Specification Group Radio Access Network; Evolved Universal Terrestrial Radio Access (E-UTRA); Physical Channels and Modulation (Release 11)," Technical Specification 36.211, Version 11.1.0, 3GPP Organizational Partners, Dec. 2012, 108 pages.
Author Unknown, "Technical Specification Group Radio Access Network; Evolved Universal Terrestrial Radio Access (E-UTRA); Physical layer procedures (Release 11)," Technical Specification 36.213, Version 11.1.0, 3GPP Organizational Partners, Dec. 2012, 160 pages.
Author Unknown, "Technical Specification Group Radio Access Network; Evolved Universal Terrestrial Radio Access (E-UTRA); Physical layer procedures (Release 12)," Technical Specification 36.213, Version 12.4.0, 3GPP Organizational Partners, Dec. 2014, 225 pages.
Author Unknown, "Technical Specification Group Radio Access Network; Evolved Universal Terrestrial Radio Access (E-UTRA); Physical layer; Measurements (Release 12)," Technical Specification 36.214, Version 12.0.0, 3GPP Organizational Partners, Sep. 2014, 14 pages.
Author Unknown, "Technical Specification Group Radio Access Network; Evolved Universal Terrestrial Radio Access (E-UTRA); Radio Resource Control (RRC); Protocol specification (Release 12)," Technical Specification 36.331, Version 12.0.0, 3GPP Organizational Partners, Dec. 2013, 349 pages.
Author Unknown, "Technical Specification Group Radio Access Network; Evolved Universal Terrestrial Radio Access (E-UTRA); Radio Resource Control (RRC); Protocol specification (Release 12)," Technical Specification 36.331, Version 12.4.1, 3GPP Organizational Partners, Dec. 2014, 410 pages.
Fujitsu, "R1-140193: Power allocation strategy for power limited UEs in dual-connectivity," 3rd Generation Partnership Project (3GPP), TSG RAN WG1 Meeting #76, Feb. 10-14, 2014, 8 pages, Prague, Czech Republic.
Qualcomm Incorporated, "R2-140501: UE maximum power and power headroom considerations in dual connectivity," 3rd Generation Partnership Project (3GPP), TSG-RAN WG2 meeting #85, Feb. 10-14, 2014, 2 pages, Prague, Czech Republic.
International Search Report and Written Opinion for International Patent Application No. PCT/IB2015/052035, dated May 29, 2015, 14 pages.
Ericsson, "R1-140762: Power control on dual connectivity," 3rd Generation Partnership Project (3GPP), TSG RAN WG1 Meeting #76, Feb. 10-14, 2014, Prague, Czech Republic, 2 pages.
Summons to Attend Oral Proceedings for European Patent Application No. 15714297, mailed Oct. 16, 2018, 9 pages.
International Search Report for International Patent Application No. PCT/CN2014/073678, dated Feb. 27, 2015, 4 pages.
International Preliminary Report on Patentability for International Patent Application No. PCT/CN2014/073678, dated Sep. 29, 2016, 8 pages.
Decision to Refuse for European Patent Application No. 15714297.7, dated Apr. 11, 2019, 20 pages.
Notice of Reasons for Refusal for Japanese Patent Application No. 2017-500466, dated May 7, 2019, 8 pages.
Office Action for Mexican Patent Application No. MX/a/2016/012025, dated Mar. 15, 2019, 7 pages.
First Search for Chinese Patent Application No. 2015800260266, dated Sep. 18, 2019, 1 page.
First Office Action for Chinese Patent Application No. 2015800260266, dated Sep. 25, 2019, 14 pages.
Decision of Refusal for Japanese Patent Application No. 2017-500466, dated Aug. 27, 2019, 7 pages.
Fujitsu, "R1-140192: Physical layer issues of dual connectivity," 3rd Generation Partnership Project (3GPP), TSG RAN WG1 Meeting #76, Feb. 10-14, 2014, Prague, Czech Republic, 8 pages.
Samsung, "R2-140192: Direct Discovery Resource Allocation," 3GPP TSG RAN WG2 Meeting #85, Prague, Czech Republic, Feb. 10-14, 2014, 5 pages.
Notice of Reasons for Rejection for Japanese Patent Application No. 2019-232268, dated Jan. 5, 2021, 8 pages.

* cited by examiner

UPLINK POWER SHARING IN DUAL CONNECTIVITY

This application is a 35 U.S.C. § 371 national phase filing of International Application No. PCT/CN2014/073678, filed Mar. 19, 2014, which claims priority to PCT/IB2015/052035, filed Mar. 19, 2015, the disclosures of which are incorporated herein by reference in their entireties.

RELATED APPLICATIONS

This application claims the benefit of Patent Cooperation Treaty (PCT) application serial number PCT/CN2014/073678, filed Mar. 19, 2014, the disclosure of which is hereby incorporated herein by reference in its entirety.

TECHNICAL FIELD

This disclosure pertains to dual connectivity in Long Term Evolution (LTE) wireless networks.

BACKGROUND

Long Term Evolution (LTE) uses Orthogonal Frequency Division Multiplexing (OFDM) in the downlink and Discrete Fourier Transform (DFT)-spread OFDM in the uplink. The basic LTE downlink physical resource can thus be seen as a time-frequency grid as illustrated in FIG. 1 where each resource element corresponds to one OFDM subcarrier during one OFDM symbol interval. In the time domain, LTE downlink transmissions are organized into radio frames of 10 milliseconds (ms), where each radio frame includes ten equally-sized subframes of length $T_{subframe}=1$ ms. FIG. 2 is a schematic diagram of an LTE time-domain structure.

Resource allocation in LTE is typically described in terms of resource blocks, where a resource block corresponds to one slot (0.5 ms) in the time domain and 12 contiguous subcarriers in the frequency domain. A pair of two adjacent resource blocks in time (1.0 ms) is known as a resource block pair. Resource blocks are numbered in the frequency domain, starting with 0 from one end of the system bandwidth.

The notion of Virtual Resource Blocks (VRBs) and Physical Resource Blocks (PRBs) has been introduced in LTE. The actual resource allocation to a User Equipment device (UE) is made in terms of VRB pairs. There are two types of resource allocations, localized and distributed. In the localized resource allocation, a VRB pair is directly mapped to a PRB pair, hence two consecutive and localized VRBs are also placed as consecutive PRBs in the frequency domain. On the other hand, distributed VRBs are not mapped to consecutive PRBs in the frequency domain, thereby providing frequency diversity for the data channel transmitted using these distributed VRBs.

Downlink transmissions are dynamically scheduled in LTE. In particular, in each subframe, the base station transmits control information pertaining to which terminals, or UEs, data is transmitted and upon which resource blocks the data is transmitted in a downlink subframe. This control signaling is typically transmitted in the first 1, 2, 3, or 4 OFDM symbols in each subframe, and the number n=1, 2, 3, or 4 is known as the Control Format Indicator (CFI). The downlink subframe also contains Common Reference Symbols (CRS), which are known to the receiver and used for coherent demodulation of, for example, the control information. A downlink system with CFI=3 OFDM symbols as control is illustrated in FIG. 3.

From LTE Release 11 onwards, the above described resource assignments can also be scheduled on the enhanced Physical Downlink Control Channel (ePDCCH). For Release 8 to Release 10, only the Physical Downlink Control Channel (PDCCH) is available. The PDCCH is used to carry Downlink Control Information (DCI) such as scheduling decisions and power-control commands. More specifically, the DCI includes downlink scheduling assignments, uplink scheduling grants, and power control commands. In particular, downlink scheduling assignments include Physical Downlink Shared Channel (PDSCH) resource indication, transport format, Hybrid Automatic Repeat Request (HARQ) information, and control information related to spatial multiplexing (if applicable). A downlink scheduling assignment also includes a command for power control of the Physical Uplink Control Channel (PUCCH) used for transmission of HARQ acknowledgements in response to downlink scheduling assignments. Uplink scheduling grants include Physical Uplink Shared Channel (PUSCH) resource indication, transport format, and HARQ-related information. An uplink scheduling grant also includes a command for power control of the PUSCH. Power control commands included in the DCI include power control commands for a set of terminals, or UEs, as a complement to the commands included in the scheduling assignments/grants.

One PDCCH carries one DCI message with one of the formats above. As multiple terminals can be scheduled simultaneously, on both downlink and uplink, there must be a possibility to transmit multiple scheduling messages within each subframe. Each scheduling message is transmitted on a separate PDCCH, and consequently there are typically multiple simultaneous PDCCH transmissions within each cell. Furthermore, to support different radio channel conditions, link adaptation can be used, where the code rate of the PDCCH is selected to match the radio channel conditions.

To allow for simple yet efficient processing of the control channels in the terminal, the mapping of PDCCHs to resource elements is subject to a certain structure. This structure is based on Control Channel Elements (CCEs), which consists of nine Resource Element Groups (REGs). The number of CCEs, one, two, four, or eight, required for a certain PDCCH depends on the payload size of the control information (DCI payload) and the channel coding rate. This is used to realize link adaptation for the PDCCH; if the channel conditions for the terminal to which the PDCCH is intended are disadvantageous, a larger number of CCEs needs to be used compared to the case of advantageous channel conditions. The number of CCEs used for a PDCCH is also referred to as the Aggregation Level (AL).

The network can then select different aggregation levels and PDCCH positions for different UEs from the available PDCCH resources. For each PDCCH, as illustrated in FIG. 4, a Cyclic Redundancy Check (CRC) is attached to each DCI message payload. The identity of the terminal (or terminals) addressed—that is, the Radio Network Temporary Identifier (RNTI)—is included in the CRC calculation and not explicitly transmitted. Depending on the purpose of the DCI message (unicast data transmission, power control command, random access response, etc.), different RNTIs are used; for normal unicast data transmission, the terminal-specific Cell RNTI (C-RNTI) is used. After CRC attachment, the bits are coded with a rate −1/3 tail-biting convolutional code and ratematched to fit the amount of resources used for PDCCH transmission. After the PDCCHs to be transmitted in a given subframe have been allocated to the desired resource elements (the details of which are given below), the sequence of bits corresponding to all the PDCCH resource elements to be transmitted in the subframe, including the unused resource elements, is scrambled by a cell- and subframe-specific scrambling sequence to randomize inter-cell interference, followed by Quadrature Phase Shift Keying (QPSK) modulation and mapping to resource elements. The entire collection of the REGs (including those unused by any PDCCH) is then interleaved across the entire control region to randomize inter-cell interference as well as capturing frequency diversity for the PDCCHs.

LTE defines so-called PDCCH search spaces, which describe the set of CCEs the terminal is supposed to monitor for scheduling assignments/grants relating to a certain component carrier. A search space is a set of candidate control channels formed by CCEs on a given aggregation level, which the terminal is supposed to attempt to decode. As there are multiple aggregation levels, corresponding to one, two, four, and eight CCEs, a terminal has multiple search spaces. In each subframe, the terminals will attempt to decode all the PDCCHs that can be formed from the CCEs in each of its search spaces. If the CRC checks, the content of the control channel is declared as valid for this terminal and the terminal processes the information (scheduling assignment, scheduling grants, etc.). Each terminal in the system therefore has a terminal-specific search space at each aggregation level.

In several situations, there is a need to address a group of, or all, terminals in the system. To allow all terminals to be addressed at the same time, LTE has defined common search spaces in addition to the terminal-specific search spaces. A common search space is, as the name implies, common, and all terminals in the cell monitor the CCEs in the common search spaces for control information. Although the motivation for the common search space is primarily transmission of various system messages, it can be used to schedule individual terminals as well. Thus, it can be used to resolve situations where scheduling of one terminal is blocked due to lack of available resources in the terminal-specific search space. More important, the common search space is not dependent of UE configuration status. Therefore, the common search space can be used when the network needs to communicate with the UE during UE reconfiguration periods. FIG. 5 is a schematic diagram illustrating common and UE-specific search spaces for two UEs.

With regard to PUCCH, if a terminal has not been assigned an uplink resource for data transmission, the L1/L2 control information (channel status reports, HARQ acknowledgments, and scheduling requests) is transmitted in uplink resources (resource blocks) specifically assigned for uplink L1/L2 control on LTE Release 8 PUCCH. As illustrated in FIG. 6, these resources are located at the edges of the total available cell bandwidth. Each such resource consists of 12 "subcarriers" (one resource block) within each of the two slots of an uplink subframe. In order to provide frequency diversity, these frequency resources are frequency hopping on the slot boundary, i.e., one "resource" consists of 12 subcarriers at the upper part of the spectrum within the first slot of a subframe and an equally sized resource at the lower part of the spectrum during the second slot of the subframe or vice versa. If more resources are needed for the uplink L1/L2 control signaling, e.g. in case of very large overall transmission bandwidth supporting a large number of users, additional resource blocks can be assigned next to the previously assigned resource blocks.

LTE Release 10 (and subsequent releases of the LTE standard) supports bandwidths larger than 20 megahertz (MHz). One important requirement in LTE Release 10 is to assure backward compatibility with LTE Release 8. This should also include spectrum compatibility. That would imply that an LTE Release 10 carrier, wider than 20 MHz, should appear as a number of LTE carriers to an LTE Release 8 terminal. Each such carrier can be referred to as a Component Carrier (CC). In particular, for early LTE Release 10 deployments, it can be expected that there will be a smaller number of LTE Release 10-capable terminals compared to many LTE legacy terminals. Therefore, it is necessary to assure an efficient use of a wide carrier also for legacy terminals, i.e., that it is possible to implement carriers where legacy terminals can be scheduled in all parts of the wideband LTE Release 10 carrier. The straightforward way to obtain this would be by means of Carrier Aggregation (CA). CA implies that an LTE Release 10 terminal can receive multiple CCs, where the CCs have, or at least the possibility to have, the same structure as a LTE Release 8 carrier. CA is illustrated in FIG. 7.

The number of aggregated CCs as well as the bandwidth of the individual CCs may be different for uplink and downlink. A symmetric configuration refers to the case where the number of CCs in downlink and uplink is the same whereas an asymmetric configuration refers to the case that the number of CCs is different. It is important to note that the number of CCs configured in a cell may be different from the number of CCs seen by a terminal. A terminal may, for example, support more downlink CCs than uplink CCs, even though the cell is configured with the same number of uplink and downlink CCs.

During initial access, an LTE Release 10 terminal behaves similar to a LTE Release 8 terminal. Upon successful connection to the network, a terminal may—depending on its own capabilities and the network—be configured with additional CCs in the uplink and the downlink. Configuration is based on Radio Resource Control (RRC). Due to the heavy signaling and rather slow speed of RRC signaling, it is envisioned that a terminal may be configured with multiple CCs even though not all of them are currently used. If a terminal is configured on multiple CCs, this would imply that the terminal has to monitor all downlink CCs for PDCCH and PDSCH. This implies a wider receiver bandwidth, higher sampling rates, etc. resulting in high power consumption.

To mitigate above problems, LTE Release 10 supports activation of CCs on top of configuration. The terminal monitors only configured and activated CCs for PDCCH and PDSCH. Because activation is based on Medium Access Control (MAC) control elements—which are faster than RRC signaling—activation/de-activation can follow the number of CCs that are required to fulfill the current data rate needs. Upon arrival of large data amounts, multiple CCs are activated, used for data transmission, and de-activated if not needed anymore. All but one CC—the Downlink Primary CC (DL PCC)—can be de-activated. Therefore, activation provides the possibility to configure multiple CCs but only activate them as needed. Most of the time, a terminal would have one or very few CCs activated, resulting in a lower reception bandwidth and thus battery consumption.

Scheduling of a CC is done on the PDCCH via downlink assignments. Control information on the PDCCH is formatted as a DCI message. In LTE Release 8, a terminal only operates with one downlink and one uplink CC and, as such, the association between downlink assignment, uplink grants, and the corresponding downlink and uplink CCs is clear. In LTE Release 10, two modes of CA need to be distinguished. The first mode is very similar to the operation of multiple LTE Release 8 terminals where a downlink assignment or an uplink grant contained in a DCI message transmitted on a CC is either valid for the downlink CC itself or for an associated (either via cell-specific or UE specific linking) uplink CC. The second mode augments a DCI message with the Carrier Indicator Field (CIF). A DCI containing a downlink assignment with CIF is valid for that downlink CC indicted with CIF, and a DCI containing an uplink grant with CIF is valid for the indicated uplink CC.

DCI messages for downlink assignments contain, among other things, resource block assignment, modulation and coding scheme related parameters, HARQ redundancy version, etc. In addition to those parameters that relate to the actual downlink transmission, most DCI formats for downlink assignments also contain a bit field for Transmit Power Control (TPC) commands. These TPC commands are used to control the uplink power control behavior of the corresponding PUCCH that is used to transmit the HARQ feedback.

In LTE Release 10, the transmission of PUCCH is mapped onto one specific uplink CC, the Uplink Primary CC (UL PCC). Terminals only configured with a single downlink CC (which is then the DL PCC) and uplink CC (which is then the UL PCC) are operating dynamic Acknowledgement/Non-Acknowledgement (ACK/NACK) on PUCCH according to LTE Release 8. The first CCE used to transmit PDCCH for the downlink assignment determines the dynamic ACK/NACK resource on LTE Release 8 PUCCH. Since only one downlink CC is cell-specifically linked with the UL PCC, no PUCCH collisions can occur since all PDCCHs are transmitted using different first CCE.

Upon reception of downlink assignments on a single Secondary CC (SCC) or reception of multiple downlink assignments, CA PUCCH should be used. A downlink SCC assignment alone is untypical. The enhanced or evolved Node B (eNB) scheduler should strive to schedule a single downlink CC assignment on the DL PCC and try to de-activate SCCs if not needed. A possible scenario that may occur is that an eNB schedules a terminal on multiple downlink CCs including the PCC. If the terminal misses all but the DL PCC assignment, the terminal will use LTE Release 8 PUCCH instead of CA PUCCH. To detect this error case, the eNB has to monitor both the LTE Release 8 PUCCH and the CA PUCCH.

In LTE Release 10, the CA PUCCH format is based on the number of configured CCs. Configuration of CCs is based on RRC signaling. After successful reception/application of the new configuration, a confirmation message is sent back making RRC signaling very safe.

Transmission and reception from a node, e.g. a terminal in a cellular system such as LTE, can be multiplexed in the frequency domain or in the time domain (or combinations thereof). Frequency Division Duplex (FDD), as illustrated on the left in FIG. 8, implies that downlink and uplink transmission take place in different, sufficiently separated, frequency bands. Time Division Duplex (TDD), as illustrated on the right in FIG. 8, implies that downlink and uplink transmission take place in different, non-overlapping time slots. Thus, TDD can operate in unpaired spectrum, whereas FDD requires paired spectrum. Typically, the structure of the transmitted signal in a communication system is organized in the form of a frame structure. For example, LTE uses ten equally-sized subframes of length 1 ms per radio frame as illustrated in FIG. 9.

In case of FDD operation (upper part of FIG. 9), there are two carrier frequencies, one for uplink transmission ($f_{UL}$) and one for downlink transmission ($f_{DL}$). At least with respect to the terminal in a cellular communications system, FDD can be either full duplex or half duplex. In the full duplex case, a terminal can transmit and receive simultaneously, while in half duplex operation, the terminal cannot transmit and receive simultaneously (the base station is capable of simultaneous reception/transmission though, e.g. receiving from one terminal while simultaneously transmitting to another terminal). In LTE, a half duplex terminal is monitoring/receiving in the downlink except when explicitly being instructed to transmit in a certain subframe.

In case of TDD operation (lower part of FIG. 9), there is only a single carrier frequency, and uplink and downlink transmissions are always separated in time also on a cell basis. As the same carrier frequency is used for uplink and downlink transmission, both the base station and the mobile terminals need to switch from transmission to reception and vice versa. An essential aspect of any TDD system is to provide the possibility for a sufficiently large guard time where neither downlink nor uplink transmissions occur. This is required to avoid interference between uplink and downlink transmissions. For LTE, this guard time is provided by special subframes (subframe 1 and, in some cases, subframe 6), which are split into three parts: a downlink part (DwPTS), a guard period (GP), and an uplink part (UpPTS). The remaining subframes are either allocated to uplink or downlink transmission.

TDD allows for different asymmetries in terms of the amount of resources allocated for uplink and downlink transmission, respectively, by means of different downlink/uplink configurations. In LTE, there are seven different configurations as shown in FIG. 10. Note that in the description below, downlink subframe can mean either downlink or the special subframe.

To avoid severe interference between downlink and uplink transmissions between different cells, neighbor cells should have the same downlink/uplink configuration. If this is not done, uplink transmission in one cell may interfere with downlink transmission in the neighboring cell (and vice versa) as illustrated in FIG. 11. Hence, the downlink/uplink asymmetry can typically not vary between cells, but is signaled as part of the system information and remains fixed for a long period of time.

A dual connectivity framework is currently being considered for LTE Release 12. Dual connectivity refers to the operation where a given UE consumes radio resources provided by at least two different network points (master and secondary eNBs) connected with non-ideal backhaul while in RRC_CONNECTED. A UE in dual connectivity maintains simultaneous connections, or links, to anchor and booster nodes, where the anchor node is also called the Master eNB (MeNB) and the booster node is also called the Secondary eNB (SeNB). As the name implies, the anchor node terminates the control plane connection towards the UE and is thus the controlling node of the UE. The UE also reads system information from the anchor. In addition to the anchor, the UE may be connected to one or several booster nodes for added user plane support. The MeNB and the SeNB are connected via the Xn interface, which is currently selected to be the same as the X2 interface between two eNBs.

The anchor and booster roles are defined from a UE point of view. This means that a node that acts as an anchor to one UE may act as booster to another UE. Similarly, though the UE reads the system information from the anchor node, a node acting as a booster to one UE may or may not distribute system information to another UE. A MeNB operates to provide system information and terminate the control plane.

In addition, the MeNB may terminate the user plane. Conversely, a SeNB operates to terminate only the user plane.

In one application, dual connectivity allows a UE to connect to two nodes in order to receive data from both of these nodes to increase the UE's data rate. This user plane aggregation achieves similar benefits as CA using network nodes that are not connected by low-latency backhaul/network connection. Due to this lack of low-latency backhaul, the scheduling and HARQ-ACK feedback from the UE to each of the nodes will be performed separately. That is, it is expected that the UE shall have two uplink transmitters to transmit uplink control and data to the connected nodes.

Uplink power control controls the transmit power of the different uplink physical channels. As an example, if the UE transmits PUSCH without a simultaneous PUCCH for the serving cell c, then the UE transmit power for PUSCH transmission in subframe i for the serving cell c is given (in milli-decibels (dBm)) by $$P_{PUSCH,c}(i) = \min \left\{ \begin{array}{l} P_{CMAX,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) \end{array} \right\},$$

where:

$P_{CMAX,c}(i)$ is the configured UE transmit power defined in 3GPP Technical Specification (TS) 36.101 V12.2.0 in subframe i for serving cell c and $\hat{P}_{CMAX,c}(i)$ is the linear value of $P_{CMAX,c}(i)$, $M_{PUSCH,c}(i)$ is the bandwidth of the PUSCH resource assignment expressed in number of resource blocks valid for subframe i and serving cell c, $P_{O\_PUSCH,c}(j)$ is a desired received power level per resource block for the serving cell c, $\alpha_c(j)$ is a parameter that can take a value smaller than or equal to 1, which allows for partial path-loss compensation.

$PL_c$ is the downlink pathloss estimate calculated in the UE for serving cell c in decibels (dB), where $PL_c$=referenceSignalPower−higher layer filtered Reference Signal Received Power (RSRP), where referenceSignalPower is provided by higher layers and RSRP is defined in 3GPP TS 36.214 V12.0.0 for the reference serving cell and the higher layer filter configuration is defined in 3GPP TS 36.331 V12.0.0 for the reference serving cell.

$\Delta_{TF,c}(i)$ is a power offset for the specific modulation and coding scheme of the PUSCH, and $f_c(i)$ is the adjustment by power control commands.

If the total transmit power of the UE would exceed $\hat{P}_{CMAX}(i)$, the UE scales $\hat{P}_{PUSCH,c}(i)$ for the serving cell c in subframe i such that the condition $$\sum_c w(i) \cdot \hat{P}_{PUSCH,c}(i) \leq (\hat{P}_{CMAX}(i) - \hat{P}_{PUCCH}(i))$$

is satisfied where $\hat{P}_{PUCCH}(i)$ is the linear value of $P_{PUCCH}(i)$, $\hat{P}_{PUSCH,c}(i)$ is the linear value of $P_{PUSCH,c}(i)$, $\hat{P}_{CMAX}(i)$ is the linear value of the UE total configured maximum output power $P_{CMAX}$ defined in 3GPP TS 36.101 V12.2.0 in subframe i, and w(i) is a scaling factor of $\hat{P}_{PUSCH,c}(i)$ for serving cell c where $0 \leq w(i) \leq 1$. In case there is no PUCCH transmission in subframe i, $\hat{P}_{PUCCH}(i)=0$.

Currently, there is no systematic solution for addressing the uplink power control problem when a UE is configured with dual connectivity. In particular, without full knowledge of uplink transmission of the other link, the MeNB and the SeNB may each expect the UE to use a high uplink power level, which in aggregate exceeds the maximum power the UE can use. There is no existing solution that enables the UE to allocate uplink power intelligently across two links when operating under power constraints. FIG. 12 is a schematic diagram illustrating uplink power for a MeNB and a SeNB exceeding a maximum allowed amount.

Further, differences between the characteristics of dual connectivity and those of CA pose challenges to uplink power control for both the eNBs and the UE when configured with dual connectivity. In particular, dual connectivity is similar to CA with multiple Timing Advance Groups (TAGs) in that the UE is simultaneously connected to two (or more) Transmission Points (TPs) that can be geographically separated. There are potentially two (or more) simultaneous downlink transmissions and two (or more) uplink transmissions for a given UE. However, the dual connectivity scenario is different from CA in several aspects.

First, in dual connectivity, the MeNB and the SeNB are allowed to be connected via a variety of backhaul links, including non-ideal backhaul links with up to 60 ms delay. In contrast, in CA, the TPs are assumed to be connected via ideal backhaul links, where delay is negligible over the X2 interface. In CA, it is assumed that the TPs have a central processing unit, which is not the case in dual connectivity. Second, in dual connectivity, the network node's MeNB and SeNB may or may not be synchronized (synchronized network or unsynchronized network). Synchronization by Global Navigation Satellite System (GNSS) or synchronization over backhaul network is not always available for small cell deployments, e.g., indoor deployment or hotspots with high buildings around. In certain deployment scenarios, it may not be feasible to synchronize the MeNB and the SeNB because the carrier frequencies that they deploy require different synchronization sources. For example, this is the case if both the MeNB and the SeNB use TDD, and the neighboring systems have different synchronization. Thus the downlink subframe boundary of the MeNB and the SeNB may or may not be aligned in time. In contrast, in CA, the network nodes are assumed to be synchronized.

Third, combining the effect of unsynchronized network and timing advance, the uplink subframe boundary misalignment, from a UE's perspective, can be up to the maximum of 7 OFDM symbols (0.5 ms). In contrast, in a CA scenario, the uplink subframe misalignment is only due to the effect of timing advance, and is considered to be limited to a maximum of ~30 microseconds (μs) plus the additional synchronization error of the two TPs. This corresponds to about a half OFDM symbol. Fourth, in dual connectivity, each eNB (MeNB and SeNB) operates its own Radio Link Control (RLC), MAC (including scheduler), and physical layer. The MeNB and the SeNB independently schedule their own uplink and downlink transmissions. Thus, for example, the UE may have two simultaneous uplink transmissions scheduled, one by the MeNB, the other by the SeNB, without one eNB being aware of the scheduling information of the other eNB. Scheduling of PUCCH/PUCCH/Physical Random Access Channel (PRACH)/Sounding Reference Signal (SRS) of one link is not known to eNB of the other link. In contrast, in CA, a single MAC (including a scheduler) controls the multiple transmission points and has full knowledge of the scheduled transmission of a given UE.

Fifth, in dual connectivity, at least one cell in the SeNB has a configured uplink and one of them is configured with PUCCH resources. Thus, a UE may be required to transmit two PUCCHs simultaneously, one towards the MeNB, the other towards the SeNB. Two sets of Uplink Control Information (UCI) may be simultaneously transmitted via PUCCH (or PUSCH) on the MeNB link and the SeNB link. In contrast, in CA, UCI is only transmitted on one serving cell (the Primary Cell (PCell)). Sixth, in dual connectivity, PRACH may be transmitted on both links simultaneously. In contrast, in CA a PRACH is only transmitted on one component carrier at a time.

These differences pose challenges to the uplink power control mechanism for both the eNBs and the UE when configured with dual connectivity. As such, there is a need for uplink power control schemes for dual connectivity.

SUMMARY

Systems and methods relating to uplink power control for a wireless device operating according to a dual connectivity scheme are disclosed. Embodiments of a method of operating a wireless device having a first link to a first wireless network node in a wireless communications network and a second link to a second wireless network node in the wireless communications network are disclosed. The first and second links are simultaneous or concurrent links to the first and second wireless network nodes, respectively. In some embodiments, the method of operating the wireless device comprises determining a first maximum transmit power level for the first link from the wireless device to the first wireless network node and a second maximum transmit power level for the second link from the wireless device to the second wireless network node and transmitting on the first link and the second link according to the first maximum transmit power level and the second maximum transmit power level, respectively. Each of the first maximum transmit power level and the second maximum transmit power level is a function of a maximum allowable transmit power level. In this manner, the transmit power of the wireless device does not exceed in maximum allowable transmit power when concurrently transmitting on the first and second links.

In some embodiments, a sum of the first maximum transmit power level and the second maximum transmit power level is less than or equal to the maximum allowable transmit power level.

In some embodiments, the first maximum transmit power level and the second maximum transmit power level are statically defined.

In some embodiments, determining the first maximum transmit power level and the second maximum transmit power level comprises determining the first maximum transmit power level and the second maximum transmit power level according to a static definition of the first maximum transmit power level and the second maximum transmit power level as respective fractions of the maximum allowable transmit power level.

In some embodiments, determining the first maximum transmit power level and the second maximum transmit power level comprises, for a particular subframe of the first link, determining the first maximum transmit power level for the particular subframe of the first link according to a static definition of the first maximum transmit power level as a first fraction of a maximum allowable transmit power for the particular subframe of the first link. Determining the first maximum transmit power level and the second maximum transmit power level further comprises, for a particular subframe of the second link that is either synchronous transmission with the particular subframe of the first link or asynchronous partially overlapping transmission with the particular subframe of the first link, determining the second maximum transmit power level for the particular subframe of the second link according to a static definition of the second maximum transmit power level as a second fraction of the maximum allowable transmit power for the particular subframe of the first link. Further, in some embodiments, the maximum allowable transmit power level varies from one subframe to another subframe. Still further, in some embodiments, the sum of the first fraction and the second fraction is less than or equal to 1.

In some embodiments, determining the first maximum transmit power level and the second maximum transmit power level comprises statically assigning values to the first maximum transmit power level and the second maximum transmit power level based on one or more of: a number of uplink antenna ports the wireless device uses over the first and/or second links, a number of serving cells configured with uplink transmission on one or both of the first and second links, and an average number of resource blocks the wireless device is expected to be assigned over one or both of the first and second links.

In some embodiments, the first maximum transmit power level and the second maximum transmit power level are semi-statically defined.

In some embodiments, determining the first maximum transmit power level and the second maximum transmit power level comprises, for a particular subframe of the first link, determining the first maximum transmit power level for the particular subframe of the first link according to a semi-static definition of the first maximum transmit power level as a first fraction of a maximum allowable transmit power for the particular subframe of the first link. Determining the first maximum transmit power level and the second maximum transmit power level further comprises, for a particular subframe of the second link that is either synchronous transmission with the particular subframe of the first link or asynchronous partially overlapping transmission with the particular subframe of the first link, determining the second maximum transmit power level for the particular subframe of the second link according to a semi-static definition of the second maximum transmit power level as a second fraction of the maximum allowable transmit power for the particular subframe of the first link. Further, in some embodiments, the maximum allowable transmit power level varies from one subframe to another subframe. Still further, in some embodiments, the sum of the first fraction and the second fraction is less than or equal to 1.

In some embodiments, the first maximum transmit power level and the second maximum transmit power level are semi-statically defined according to a known pattern over a period of time.

In some embodiments, the method of operating the wireless device further comprises determining whether a total calculated transmit power level for the first and second links is greater than the maximum allowable transmit power level. Transmitting on the first link and the second link according to the first maximum transmit power level and the second maximum transmit power level, respectively, comprises transmitting on the first link and the second link according to the first maximum transmit power level and the second maximum transmit power level for one or both of the links if the total calculated transmit power level for the first and second links is less than the maximum allowable transmit power level.

In some embodiments, determining the first maximum transmit power level for the first link from the wireless device to the first wireless network node and the second maximum transmit power level for the second link from the wireless device to the second wireless network node comprises dynamically determining the first maximum transmit power level for the first link from the wireless device to the first wireless network node and the second maximum transmit power level for the second link from the wireless device to the second wireless network node for each subframe.

In some embodiments, the first and second links have asynchronous overlapping transmissions, and dynamically determining the first maximum transmit power level for the first link from the wireless device to the first wireless network node and the second maximum transmit power level for the second link from the wireless device to the second wireless network node for each subframe comprises, for a particular subframe of the first link, determining the first maximum transmit power level for the particular subframe of the first link while taking into consideration a partial overlap between the particular subframe of the first link and an overlapping subframe of the second link.

In some embodiments, the overlapping subframe of the second link is a subframe of the second link that ends at a time that is after the beginning of the particular subframe of the first link but before an end of the particular subframe of the first link.

In some embodiments, determining the first maximum transmit power level for the particular subframe of the first link while taking into consideration the partial overlap between the particular subframe of the first link and the overlapping subframe of the second link comprises determining the first maximum transmit power level for the particular subframe of the first link such that a total transmit power of the particular subframe of the first link and the overlapping subframe of the second link is less than or equal to a maximum allowable transmit power for the particular subframe of the first link.

In some embodiments, the first and second links have asynchronous overlapping transmissions, and dynamically determining the first maximum transmit power level for the first link from the wireless device to the first wireless network node and the second maximum transmit power level for the second link from the wireless device to the second wireless network node for each subframe comprises determining whether a total transmit power across the subframe of the first link and the overlapping subframe of the second link exceeds a maximum allowable transmit power level for the subframe of the first link and, if the total transmit power across the subframe of the first link and the overlapping subframe of the second link exceeds the maximum allowable transmit power level for the subframe of the first link, scaling a transmit power level for an uplink channel or signal in the subframe of the first link such that, after, the total transmit power across the subframe of the first link and the overlapping subframe of the second link does not exceed the maximum allowable transmit power level for the subframe of the first link.

In some embodiments, the first and second links have asynchronous overlapping transmissions, and dynamically determining the first maximum transmit power level for the first link from the wireless device to the first wireless network node and the second maximum transmit power level for the second link from the wireless device to the second wireless network node for each subframe comprises, for a particular subframe of the first link, determining the first maximum transmit power level for the particular subframe of the first link while taking into consideration a partial overlap between the particular subframe of the first link and two consecutive subframes of the second link. In some embodiments, the two overlapping subframes of the second link consist of: (a) a first overlapping subframe that is a subframe of the second link that ends at a time that is after the beginning of the particular subframe of the first link but before an end of the particular subframe of the first link and (b) a second overlapping subframe that is a subframe of the second link that begins at an end of the first overlapping subframe and ends at a time that is after the end of the particular subframe of the first link.

In some embodiments, determining the first maximum transmit power level for the particular subframe of the first link while taking into consideration the partial overlap between the particular subframe of the first link and the two overlapping subframes of the second link comprises determining the first maximum transmit power level for the particular subframe of the first link such that a total transmit power of the particular subframe of the first link and the first overlapping subframe of the second link and the total transmit power of the particular subframe of the first link and the second overlapping subframe of the second link are both less than or equal to the maximum allowable transmit power for the particular subframe of the first link.

In some embodiments, at least one of the particular subframe of the first link and the overlapping subframe of the second link comprises at least two simultaneous channels, and determining the first maximum transmit power level for the particular subframe of the first link comprises determining the first maximum transmit power level of the particular subframe of the first link while taking into consideration transmission power of the at least two simultaneous channels in the partial overlap between the particular subframe of the first link and the overlapping subframe of the second link.

In some embodiments, at least one of the first link and the second link has multiple serving cells, and determining the first maximum transmit power level for the particular subframe of the first link comprises determining the first maximum transmit power level of the particular subframe of the first link while taking into consideration transmission power for all of the multiple serving cells in the partial overlap between the particular subframe of the first link and the overlapping subframe of the second link.

In some embodiments, dynamically determining the first maximum transmit power level for the first link from the wireless device to the first wireless network node and the second maximum transmit power level for the second link from the wireless device to the second wireless network node for each subframe comprises calculating transmission power levels for channels transmitted on the first link and the second link and performing scaling of the transmission power levels for the channels transmitted on the first link and the second link by applying a first scaling factor to a channel transmitted on the first link to thereby determine the first maximum transmit power level such that a total transmission power of the wireless device does not exceed a maximum allowable transmit power level.

In some embodiments, the first scaling factor and the second scaling factor are determined by the wireless device.

In some embodiments, the wireless network nodes are radio access nodes in a cellular communications network.

In some embodiments, a method of operating a wireless device having a first link to a first wireless network node in a wireless communications network and a second link to a second wireless network node in the wireless communications network, where the first link and the second link are simultaneous links, comprises assigning a first transmission power to the first link and a second transmission power to the second link according to a first priority associated with the first link and a second priority associated with the second link and transmitting on the first link and the second link according to the first transmission power and the second transmission power, respectively.

In some embodiments, assigning the first transmission power to the first link before assigning the second transmission power to the second link if the first priority associated with the first link is higher than the second priority associated with the second link.

In some embodiments, assigning the first transmission power to the first link and the second transmission power to the second link comprises assigning a first maximum transmit power level to the first link and assigning a remaining transmit power to the second link if the first priority is greater than the second priority and assigning a second maximum transmit power level to the second link and assigning a remaining transmit power to the first link if the second priority is greater than the first priority.

In some embodiments, the method of operating the wireless device further comprises associating the first priority with the first link based on a channel to be transmitted on the first link and associating the second priority with the second link based on a channel to be transmitted on the second link.

In some embodiments, assigning the first priority to the first link based on the one or more channels to be transmitted on the first link and assigning the second priority to the second link based on the one or more channels to be transmitted on the second link comprises assigning the first priority and the second priority according to predefined priorities of a plurality of channel types, the predefined priorities of the plurality of channel types being such that: Physical Random Access Channel (PRACH) has a higher priority than Physical Uplink Control Channel (PUCCH); PUCCH has a higher priority than PUSCH with Uplink Control Information (UCI); PUSCH with UCI has a higher priority than PUSCH without UCI; and PUSCH without UCI has a higher priority than Sounding Reference Signal (SRS).

In some embodiments, assigning the first priority to the first link based on the one or more channels to be transmitted on the first link and assigning the second priority to the second link based on the one or more channels to be transmitted on the second link comprises assigning the first priority and the second priority according to predefined priorities of a plurality of channel types, the predefined priorities of the plurality of channel types being such that: PRACH has a higher priority than PUCCH with Acknowledgement/Non-Acknowledgement (ACK/NACK); PUCCH with ACK/NACK has a higher priority than PUSCH with ACK/NACK; PUSCH with ACK/NACK has a higher priority than PUSCH with Channel State Information (CSI) only; PUSCH with CSI only has a higher priority than PUCCH with CSI only; PUCCH with CSI only has a higher priority than SRS; and SRS has a higher priority than PUSCH with UCI carrying periodic CSI reports triggered by the wireless communications network.

In some embodiments, associating the first transmission power with the first link and the second transmission power with the second link comprises dropping SRSs from one of the first link and the second link if a higher priority channel is to be transmitted in the other one of the first link and the second link.

In some embodiments, the method of operating the wireless device further comprises associating the first priority with the first link based on one or more information types to be transmitted on the first link and associating the second priority with the second link based on one or more information types to be transmitted on the second link.

Embodiments of a wireless device operating as described above are also disclosed.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Systems and methods enabling uplink power sharing for dual connectivity are disclosed. Embodiments are described herein in which a maximum uplink (UL) power on each link is configured statically, semi-statically, or dynamically. In general, regardless of the embodiment, uplink power for uplink transmissions from a wireless device on two simultaneous links is controlled such that the total uplink power does not exceeds a maximum UL transmission power level while, in some embodiments, taking into account priorities of the two links and/or priorities of various uplink channels transmitted by the wireless device on the two links. Notably, while the embodiments described herein focus on dual connectivity, the embodiments described herein can easily be extended to any number of two or more simultaneous links.

Figure 1:
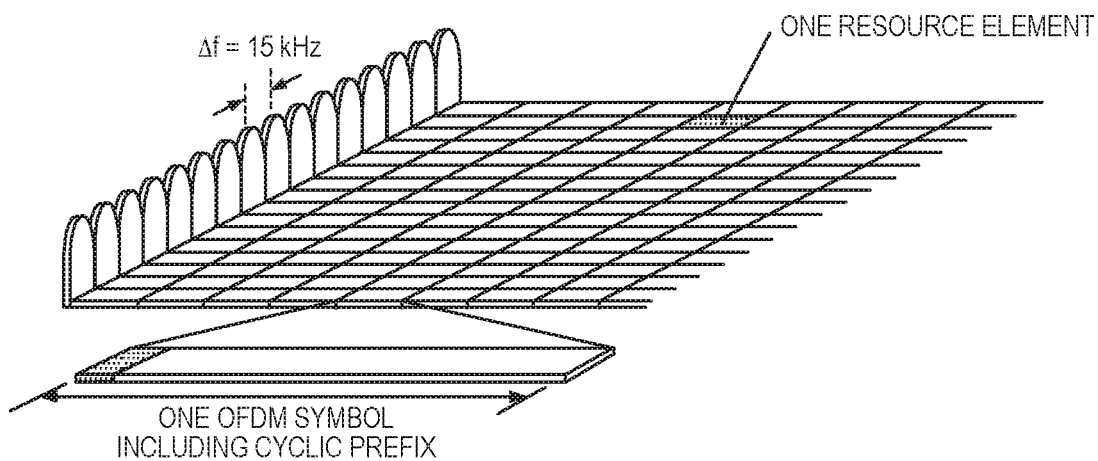
FIG. 1 illustrates a basic Long Term Evolution (LTE) downlink physical resource.
Figure 2:
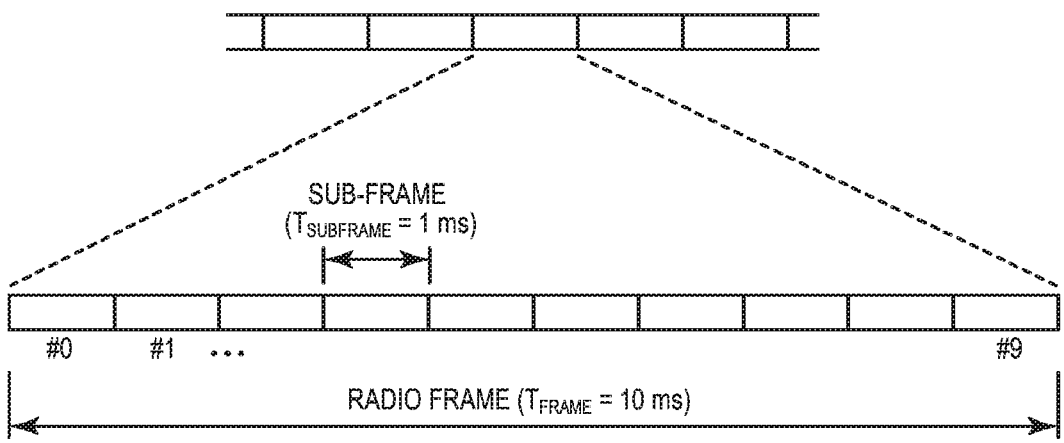
FIG. 2 is a schematic diagram of an LTE time domain structure.
Figure 3:
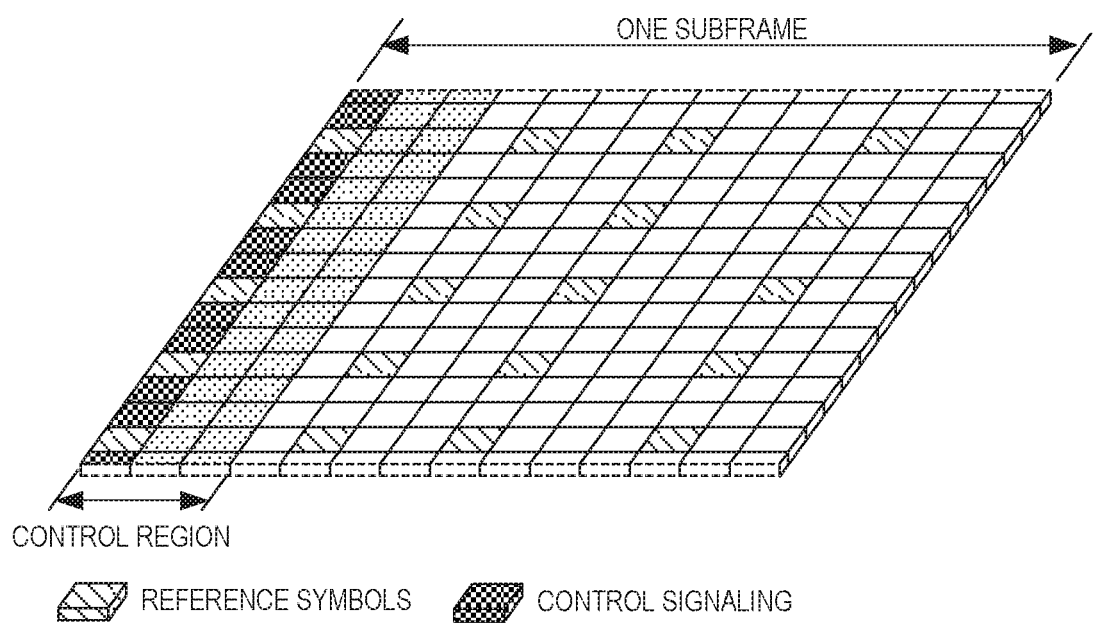
FIG. 3 illustrates a LTE downlink subframe with a control region of three Orthogonal Frequency Division Multiplexing (OFDM) symbols.
Figure 4:
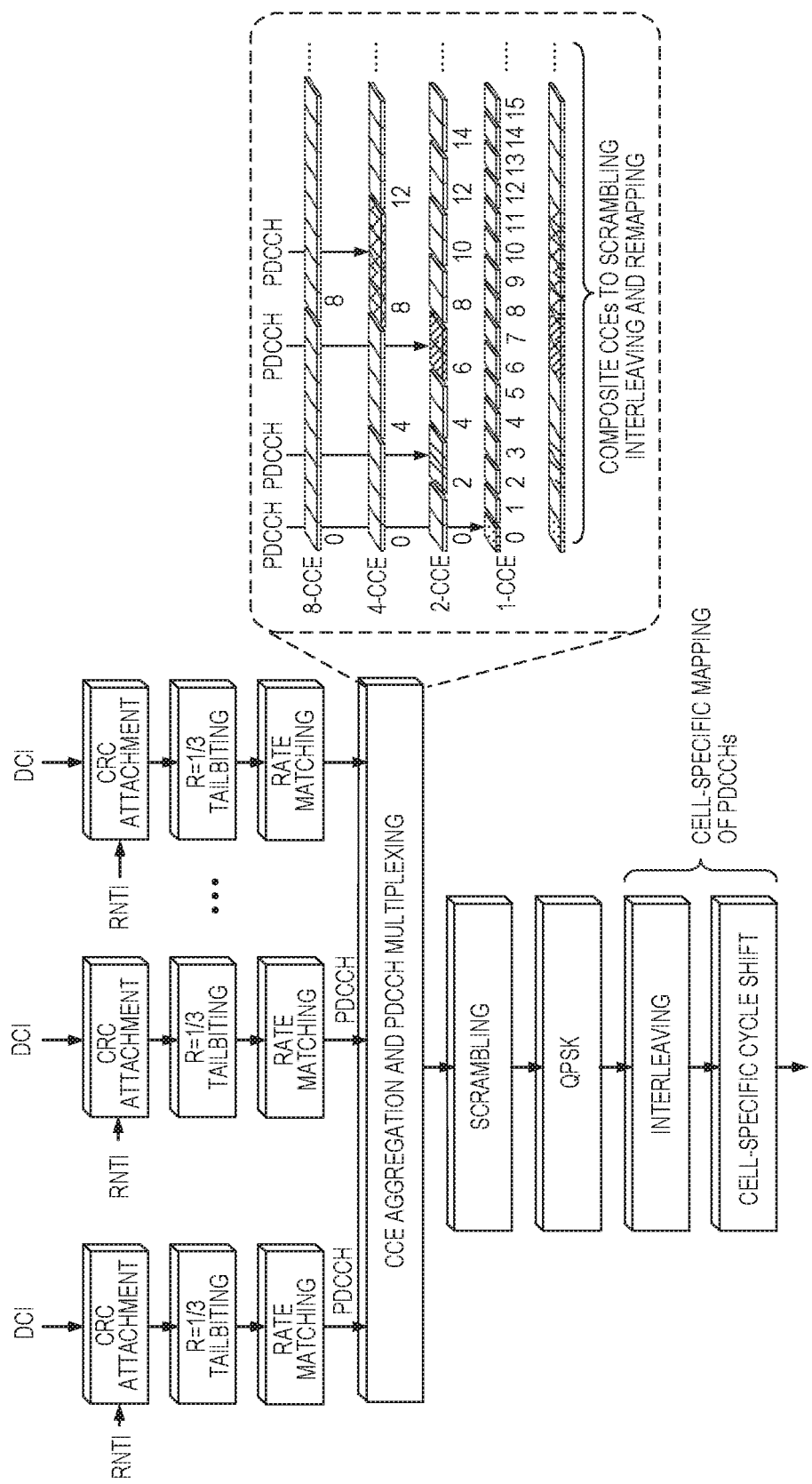
FIG. 4 illustrates processing of Layer 1 (L1)/Layer 2 (L2) control signaling LTE where, for each Physical Downlink Control Channel (PDCCH), a Cyclic Redundancy Check (CRC) is attached to each Downlink Control Information (DCI) message.
Figure 5:
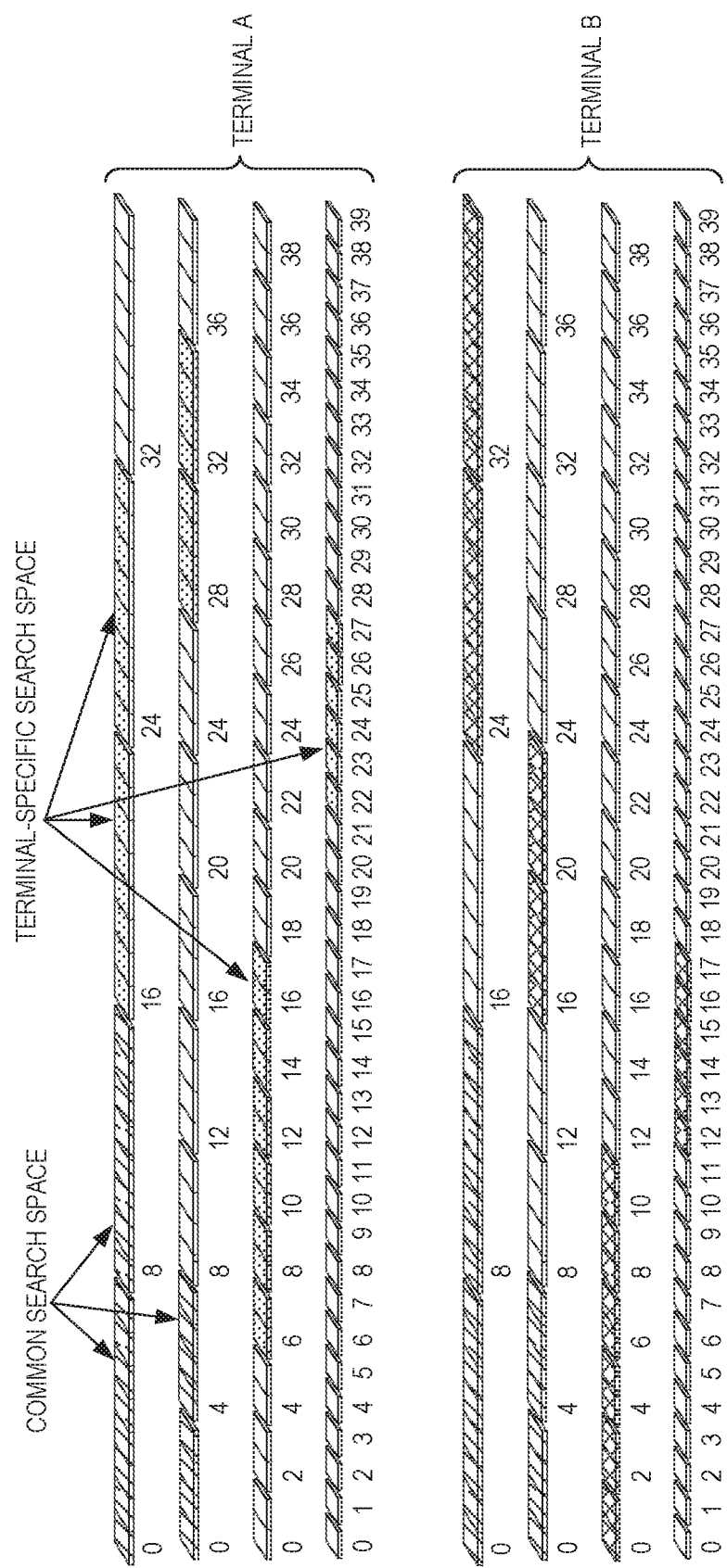
FIG. 5 is a schematic diagram illustrating common and User Equipment device (UE) specific search spaces for two UEs.
Figure 6:
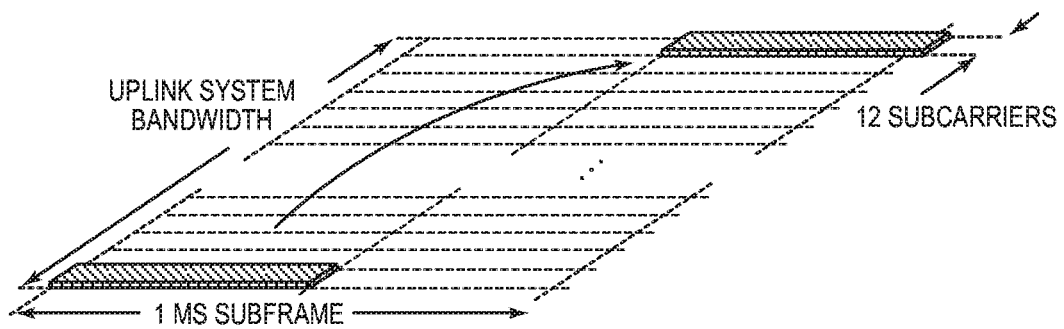
FIG. 6 is a schematic diagram illustrating resources specifically assigned for uplink L1/L2 control on LTE Release 8 Physical Uplink Control Channel (PUCCH)
Figure 7:
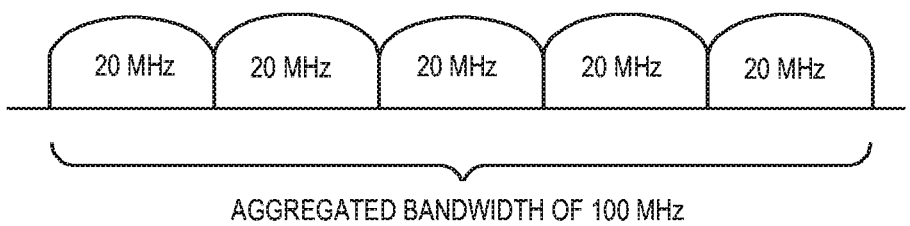
FIG. 7 illustrates Carrier Aggregation (CA)
Figure 8:
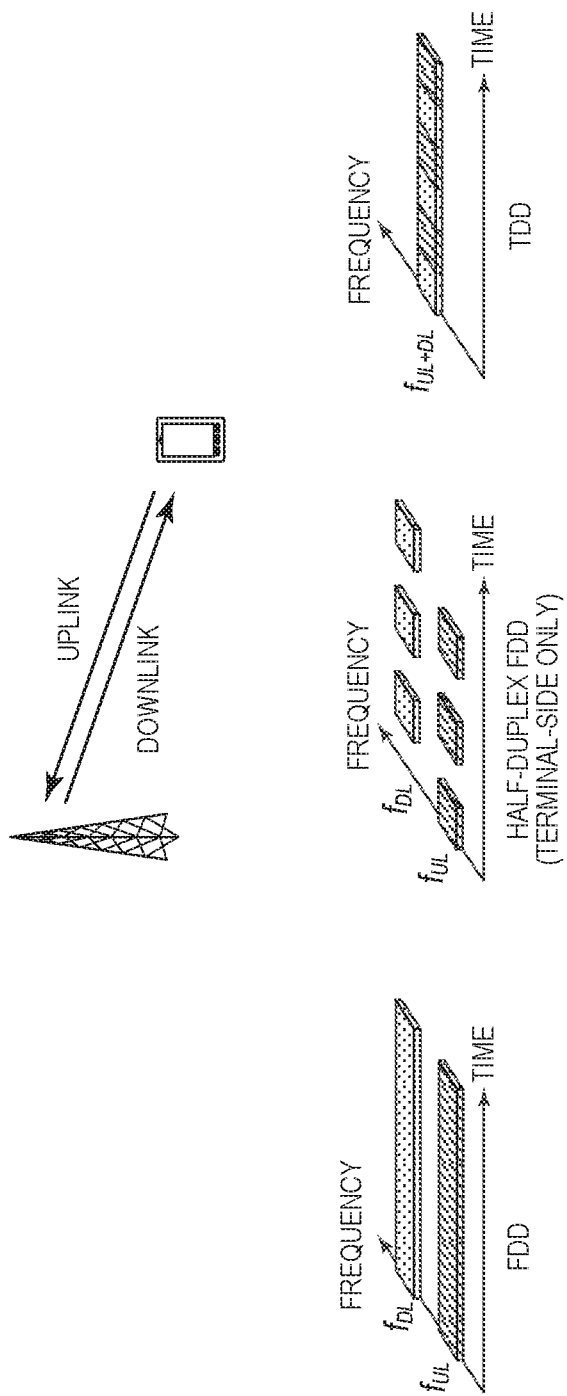
FIG. 8 illustrates Frequency Division Duplex (FDD) and Time Division Duplex (TDD) in a cellular communications network.
Figure 9:
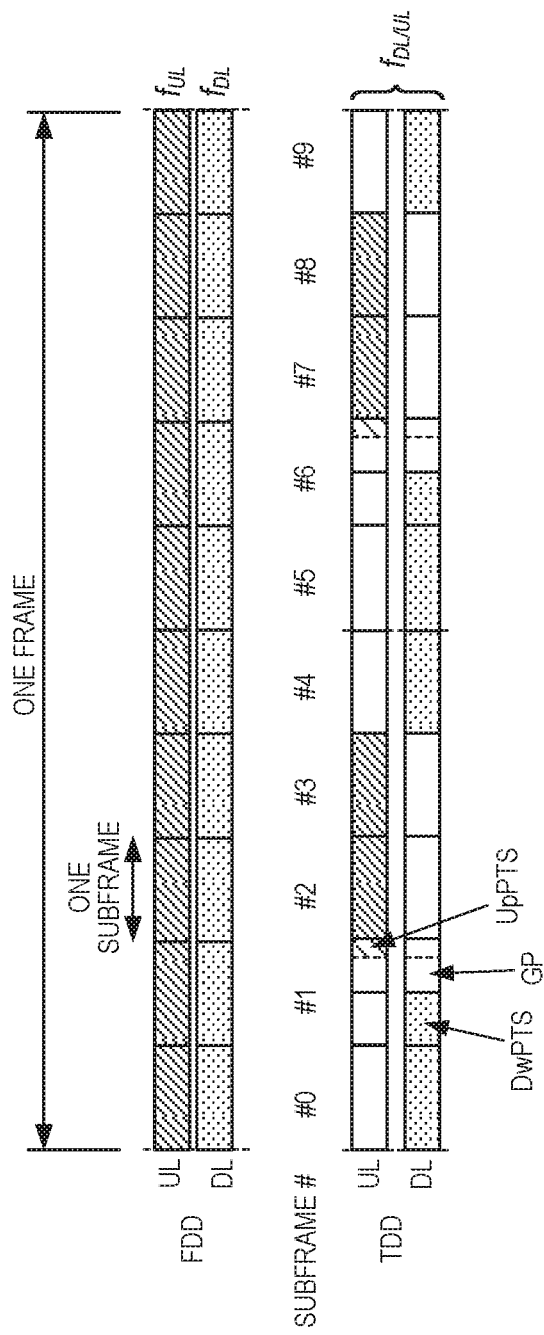
FIG. 9 illustrate LTE frame structures for FDD and TDD.
Figure 10:
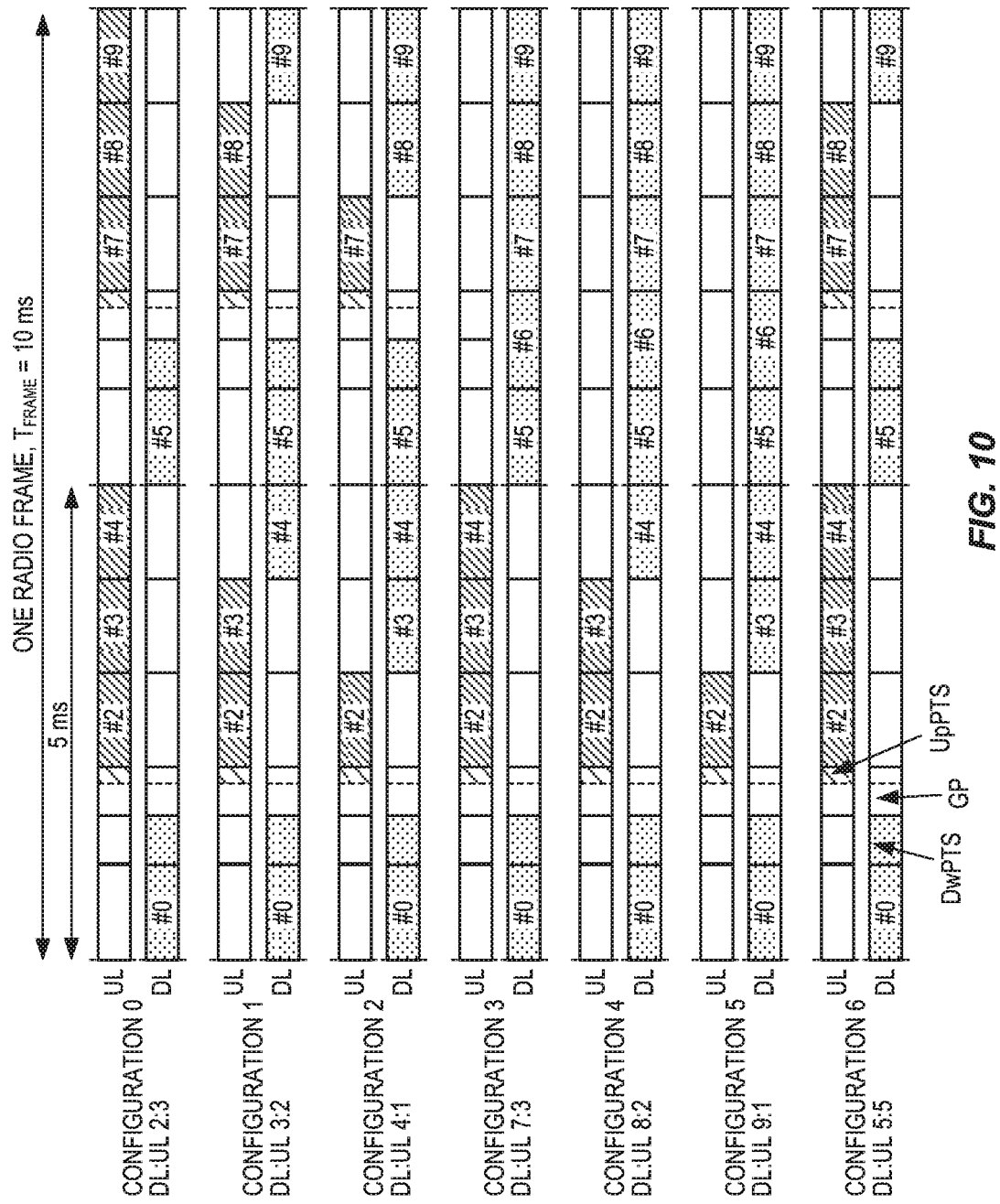
FIG. 10 illustrates seven different TDD configurations allowed in LTE.
Figure 11:
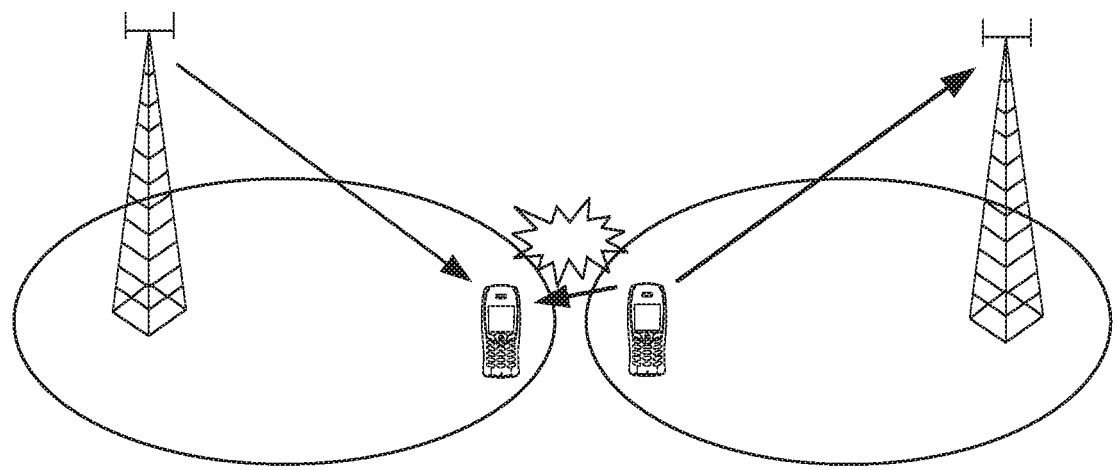
FIG. 11 illustrates a scenario where an uplink transmission in one cell interferes with downlink transmission in a neighboring cell.
Figure 12:
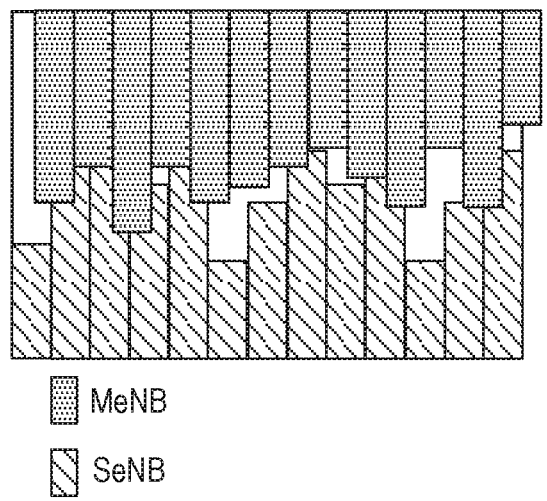
FIG. 12 is a schematic diagram illustrating uplink power for a Master evolved or enhanced Node B (MeNB) and a Secondary evolved or enhanced Node B (SeNB) when a wireless device is operating in a dual-connectivity mode of operation.
Figure 13:
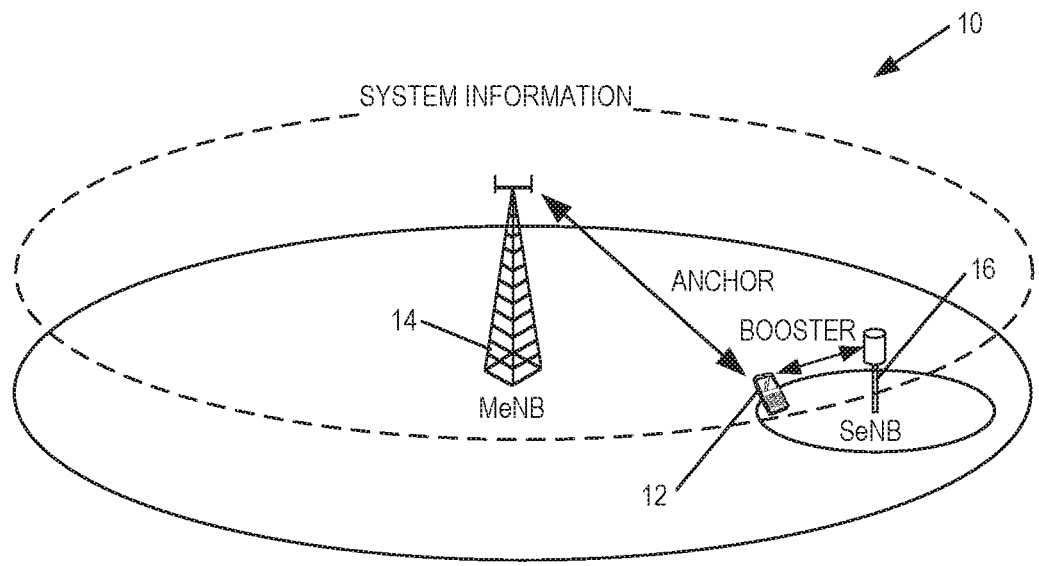
FIG. 13 illustrates a cellular communications network enabling uplink power control for dual connectivity according to some embodiments of the present disclosure.

FIG. 13 illustrates a cellular communications network 10 enabling uplink power control for dual connectivity according to some embodiments of the present disclosure. In the description provided herein, the cellular communications network 10 is a Long Term Evolution (LTE) network and, as such, LTE terminology is oftentimes used. However, the present disclosure is not limited to LTE. Rather, the embodiments disclosed herein can be implemented in any suitable wireless system that supports dual connectivity. As such, a more general term "wireless network node" is used herein to refer to any wireless node in any type of wireless network (e.g., a radio access node such as a base station or an enhanced or evolved Node B (eNB) in a cellular communications network such as an LTE network, a wireless access node in a local wireless network such as a WiFi network, or the like).

As illustrated, the cellular communications network 10 includes a wireless (e.g., a User Equipment device (UE)) having two simultaneous links to a Master eNB (MeNB) 14 and a Secondary eNB (SeNB) 16 for uplink transmissions according to a dual connectivity scheme. The MeNB 14 may also be referred to herein as an anchor eNB, and the SeNB 16 may also be referred to herein as a booster eNB.

As discussed above, one problem with conventional dual connectivity schemes is that the maximum UL transmission power levels for the two links are independent from one another. As a result, the total uplink transmit power of the wireless device 12 may exceed a maximum allowable transmit power level. The maximum allowable transmit power level is some predefined power level that is, for example, defined to take into account the maximum UL power allowed in the given cell, the UE power class of the wireless device 12, the modulation and transmit bandwidth, compliance with applicable electromagnetic energy absorption requirements, and other requirements. As discussed below, systems and methods are described herein that ensure that the total transmit power of the wireless device 12 across the two links does not exceed the maximum allowable transmit power level.

In some embodiments, the maximum allowable transmit power level is enforced by defining two static, fixed maximum transmit power levels, $P_{MeNB,max}$ and $P_{SeNB,max}$, for the link to the MeNB 14 and the link to the SeNB 16, respectively, where $$\hat{P}_{MeNB,max} + \hat{P}_{SeNB,max} = \hat{P}_{CMAX}(i) \quad (1)$$

Here $\hat{P}_{MeNB,max}$ is the linear value of a maximum output power of the wireless device 12 on the MeNB link, $\hat{P}_{SeNB,max}$ is the linear value of a maximum output power of the wireless device 12 on the SeNB link, and $\hat{P}_{CMAX}(i)$ is the linear value of a configured total maximum output power $P_{CMAX}$ of the wireless device 12 for subframe i. The total maximum output power $\hat{P}_{CMAX}(i)$ of the wireless device 12 may be fixed (i.e., the same for all subframes) or may be variable (e.g., vary between at least some subframes over time).

The static maximum power levels $\hat{P}_{MeNB,max}$ and $\hat{P}_{SeNB,max}$ are known to both the MeNB 14 and the SeNB 16 as well as the wireless device 12. The static maximum transmit power levels $\hat{P}_{MeNB,max}$ and $\hat{P}_{SeNB,max}$ do not vary with time. In particular, in some embodiments, the static maximum transmit power levels $\hat{P}_{MeNB,max}$ and $\hat{P}_{SeNB,max}$ are defined as static fractions, or static percentages, of the total maximum output power $\hat{P}_{CMAX}(i)$ of the wireless device 12. Note, however, that while the static fractions do not change over time, the total maximum output power $\hat{P}_{CMAX}(i)$ may, in some embodiments, change over time. As a result, the static maximum transmit power levels $\hat{P}_{MeNB,max}$ and $\hat{P}_{SeNB,max}$ may actually vary over time, but the proportions of the total maximum output power $\hat{P}_{CMAX}(i)$ that correspond to the maximum transmit power levels $\hat{P}_{MeNB,max}$ and $\hat{P}_{SeNB,max}$ do not change. One benefit of using the static maximum power levels $\hat{P}_{MeNB,max}$ and $\hat{P}_{SeNB,max}$ is that no explicit signaling is necessary.

Figure 14:
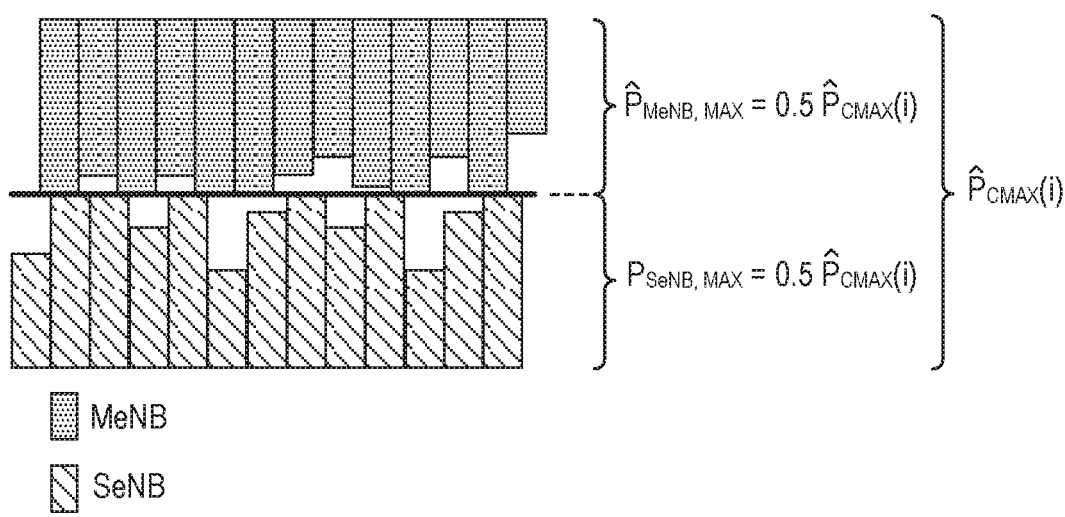
FIG. 14 is a schematic diagram illustrating static maximum power levels defined for the MeNB link and the SeNB link according to some embodiments of the present disclosure.

FIG. 14 is a schematic diagram illustrating static maximum power levels defined for MeNB and SeNB links according to one example. As illustrated, in this example, $\hat{P}_{MeNB,max} = \hat{P}_{SeNB,max} = 0.5 \times \hat{P}_{CMAX}(i)$. However, this is only an example. As will be appreciated by one of ordinary skill in the art upon reading this disclosure, this static scenario may more generally be expressed as:

$$\hat{P}_{MeNB,max} = \gamma_{MeNB} \hat{P}_{CMAX}(i) \text{ and}$$

$$\hat{P}_{SeNB,max} = \gamma_{SeNB} \hat{P}_{CMAX}(i), \text{ where}$$

$$\gamma_{MeNB} + \gamma_{SeNB} = 1.$$

The maximum transmit power levels $\hat{P}_{MeNB,max}$ and $\hat{P}_{SeNB,max}$ may be allocated in any suitable manner. As a first example, the maximum transmit power levels $\hat{P}_{MeNB,max}$ and $\hat{P}_{SeNB,max}$ may be allocated as $\hat{P}_{MeNB,max} = \hat{P}_{SeNB,max} = 5 \times \hat{P}_{CMAX}(i)$. This allocation treats the MeNB link and the SeNB link equally in terms of uplink power. As a second example, the MeNB link and the SeNB link may be assigned unequal maximum power levels (i.e., $\hat{P}_{MeNB,max} \neq \hat{P}_{SeNB,max}$) according to, e.g., a number of uplink antenna ports that the wireless device 12 uses over the two links, the number of serving cells configured with uplink transmission on each of the two links, or an average number of Resource Blocks (RBs) that the wireless device 12 is expected to be assigned over the two links.

Figure 15:
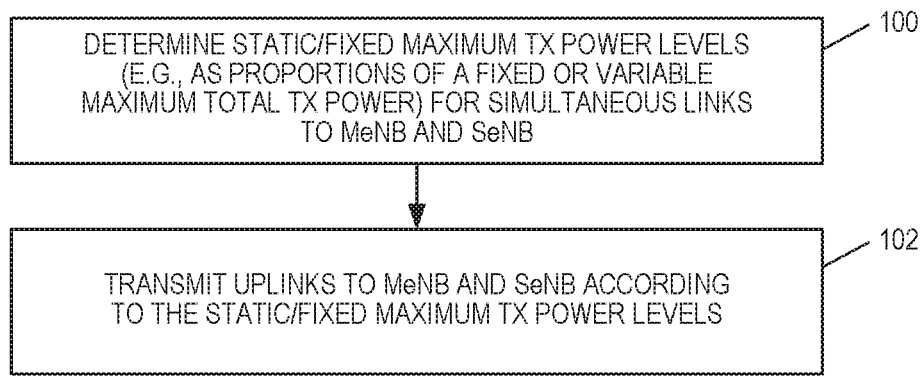
FIG. 15 is a flow chart that illustrates the operation of a wireless device to operate according to a static configuration of maximum transmit power levels for the MeNB link and the SeNB link according to some embodiments of the present disclosure.

FIG. 15 is a flow chart that illustrates the operation of the wireless device 12 to operate according to a static configuration of the maximum transmit power levels $\hat{P}_{MeNB,max}$ and $\hat{P}_{SeNB,max}$ according to some embodiments of the present disclosure. This process simply illustrates some of the embodiments described above. As illustrated, the wireless device 12 determines the maximum transmit power levels $\hat{P}_{MeNB,max}$ and $\hat{P}_{SeNB,max}$ for the simultaneous links to the MeNB 14 and the SeNB 16 (step 100). As discussed above, the maximum transmit power levels $\hat{P}_{MeNB,max}$ and $\hat{P}_{SeNB,max}$ may be defined as static fractions, or percentages, of the total maximum allowable output power $\hat{P}_{CMAX}(i)$ of the wireless device 12. These static fractions, which are denoted as $\gamma_{MeNB}$ and $\gamma_{MeNB}$ above, may be assigned in any suitable manner (e.g., defined by the wireless device 12 or configured by the MeNB 14). The wireless device 12 transmits uplink transmissions on the MeNB link and the SeNB link according to the maximum transmit power levels $\hat{P}_{MeNB,max}$ and $\hat{P}_{SeNB,max}$, respectively (step 102).

Figure 16:
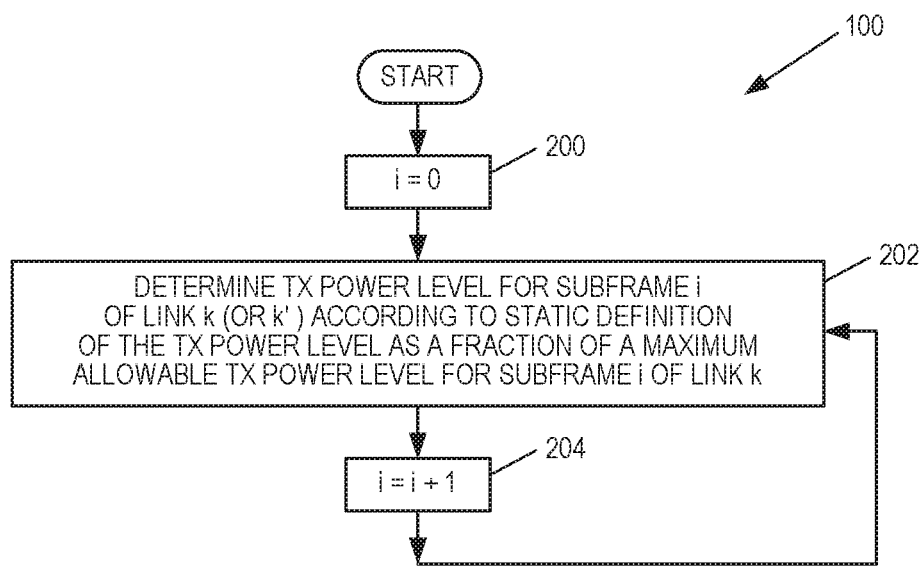
FIG. 16 illustrates one of the steps of FIG. 15 in more detail according to some embodiments of the present disclosure.

FIG. 16 illustrates step 100 of FIG. 15 in more detail according to some embodiments of the present disclosure. FIG. 16 illustrates the manner in which the maximum transmit power level $\hat{P}_{MeNB,max}$ is determined. The same process can be used to determine the maximum transmit power level $\hat{P}_{SeNB,max}$. As illustrated, a subframe index is first initialized (e.g., to a value of 0) (step 200). The wireless device 12 then determines the maximum transmit power level $\hat{P}_{MeNB,max}$ for subframe i of the link to the MeNB 14, which is referred to herein as link k, according to a static definition of the maximum transmit power level $\hat{P}_{MeNB,max}$ as a fraction of the maximum allowable transmit power $\hat{P}_{CMAX}(i)$ of the wireless device 12 for subframe i (step 202). The index i is then incremented (step 204), and the process then returns to step 202. In this manner, the wireless device 12 determines the maximum transmit power level $\hat{P}_{MeNB,max}$ for each subframe i transmitted on link k (i.e., the link to the MeNB 14).

Using the same process, the wireless device 12 determines the maximum transmit power level $\hat{P}_{SeNB,max}$ for each subframe i transmitted on link k' (i.e., the link to the SeNB 16) according to a static definition of the maximum transmit power level $\hat{P}_{SeNB,max}$ as a fraction of the maximum allowable transmit power level for the subframe i transmitted on link k'. Notably, for this discussion, it is assumed that the maximum allowable transmit power level $\hat{P}_{CMAX}(i)$ is determined by taking into account the requirements of subframe i to be transmitted on link k and the requirements of subframe i to be transmitted on link k'.

Figure 17:
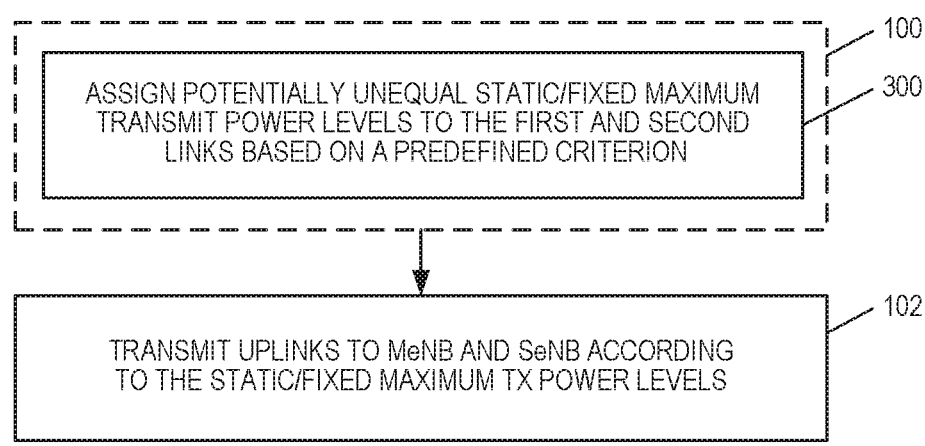
FIG. 17 illustrates the process of FIG. 15 in which the wireless device determines the maximum transmit power levels for the MeNB and SeNB links by assigning values to the maximum transmit power levels based on a defined criterion.

As discussed above, in some embodiments, the wireless device 12 assigns the maximum transmit power levels $\hat{P}_{MeNB,max}$ and $\hat{P}_{SeNB,max}$ based on a criterion such as, for example, a number of uplink antenna ports that the wireless device 12 uses over the two links, the number of serving cells configured with uplink transmission on each of the two links, or an average number of RBs that the wireless device 12 is expected to be assigned over the two links. In this regard, FIG. 17 illustrates the process of FIG. 15 in which the wireless device 12 determines the maximum transmit power levels $\hat{P}_{MeNB,max}$ and $\hat{P}_{SeNB,max}$ by assigning (potentially unequal) values to the maximum transmit power levels $\hat{P}_{MeNB,max}$ and $\hat{P}_{SeNB,max}$ based on a defined criterion according to some embodiments of the present disclosure.

More specifically, as illustrated, the wireless device 12 determines the maximum transmit power levels $\hat{P}_{MeNB,max}$ and $\hat{P}_{SeNB,max}$ (step 100) by assigning (potentially unequal) values as the maximum transmit power levels $\hat{P}_{MeNB,max}$ and $\hat{P}_{SeNB,max}$ based on a predefined criterion (step 300). As discussed above, the predefined criterion may be, for example, a number of uplink antenna ports that the wireless device 12 uses over the two links, the number of serving cells configured with uplink transmission on each of the two links, or an average number of RBs that the wireless device 12 is expected to be assigned over the two links. In some embodiments, more than one of these criteria may be considered. As discussed above, the wireless device 12 transmits uplink transmissions on the MeNB link and the SeNB link according to the maximum transmit power levels $\hat{P}_{MeNB,max}$ and $\hat{P}_{SeNB,max}$, respectively (step 102).

The embodiments of FIGS. 14 through 17 relate to a static configuration of the maximum transmit power levels $\hat{P}_{MeNB,max}$ and $\hat{P}_{SeNB,max}$ for the simultaneous uplink transmissions to the MeNB 14 and the SeNB 16 according to the dual connectivity scheme. The discussion will now turn to embodiments in which the configuration of the maximum transmit power levels $\hat{P}_{MeNB,max}$ and $\hat{P}_{SeNB,max}$ is semi-static.

In some embodiments, instead of assigning static or fixed maximum transmit power levels, adjustment may be made in a semi-static manner over time. In some embodiments, the maximum transmit power levels $\hat{P}_{MeNB,max}$ and $\hat{P}_{SeNB,max}$ are fixed over a period T (e.g., fractions or percentages of the maximum allowable transmit power level $\hat{P}_{CMAX}(i)$ over a period T are fixed), while the maximum transmit power levels $\hat{P}_{MeNB,max}$ and $\hat{P}_{SeNB,max}$ may vary from one time period T to another (e.g., fractions or percentages of the maximum allowable transmit power level $\hat{P}_{CMAX}(i)$ may vary from one time period T to another).

Figure 18:
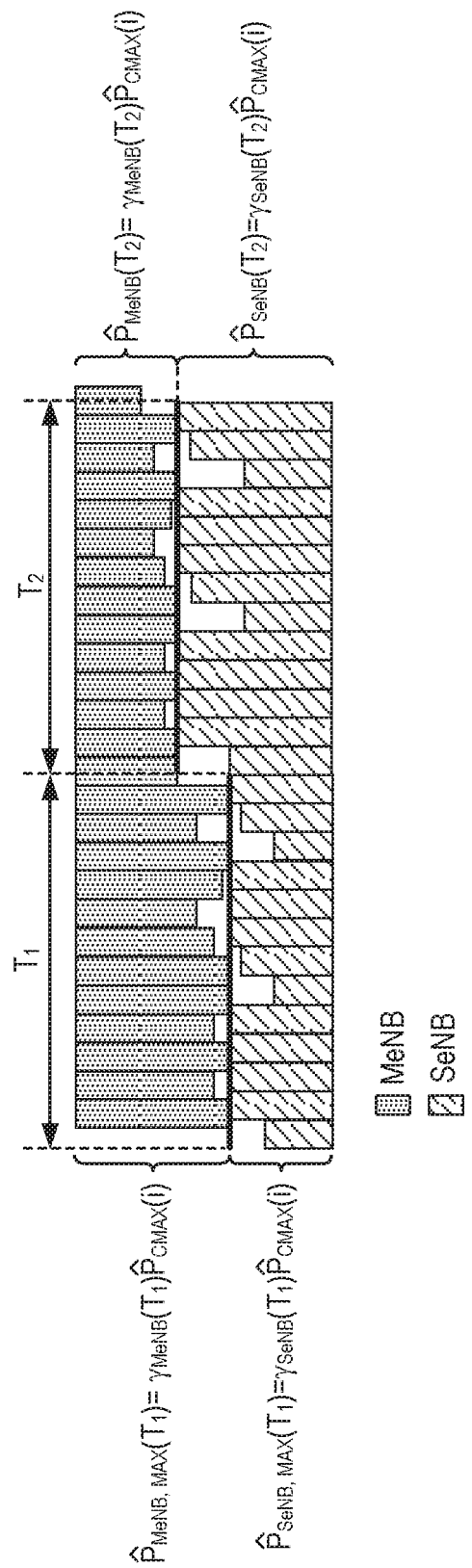
FIG. 18 illustrates semi-static configuration of the maximum transmit power levels for the MeNB and SeNB links according to some embodiments of the present disclosure.

Semi-static configuration of the maximum transmit power levels $\hat{P}_{MeNB,max}$ and $\hat{P}_{SeNB,max}$ is illustrated in FIG. 18. In this example, the maximum transmit power levels $\hat{P}_{MeNB,max}$ and $\hat{P}_{SeNB,max}$ are defined as semi-static fractions, or percentages, $\gamma_{MeNB}$ and $\gamma_{MeNB}$, of the maximum allowable transmit power level $\hat{P}_{CMAX}(i)$. In particular, the maximum transmit power levels $\hat{P}_{MeNB,max}$ and $\hat{P}_{SeNB,max}$ during a first time period ($T_1$), which are denoted as $\hat{P}_{MeNB,max}(T_1)$ and $\hat{P}_{SeNB,max}(T_1)$, are:

$$\hat{P}_{MeNB,max}(T_1) = \gamma_{MeNB}(T_1)\hat{P}_{CMAX}(i), \text{ and}$$

$$\hat{P}_{SeNB,max}(T_1) = \gamma_{SeNB}(T_1)\hat{P}_{CMAX}(i),$$

where $\gamma_{MeNB}(T_1)$ and $\gamma_{SeNB}(T_1)$ are the semi-statically defined fractions defined for the first time period $T_1$ and $\gamma_{MeNB}(T_1) + \gamma_{SeNB}(T_1) = 1$. Notably, in this example, it is assumed that the maximum allowable transmit power level $\hat{P}_{CMAX}(i)$ is constant during the first time period $T_1$, but the present disclosure is not limited thereto. Similarly, the maximum transmit power levels $\hat{P}_{MeNB,max}$ and $\hat{P}_{SeNB,max}$ during a second time period ($T_2$), which are denoted as $\hat{P}_{MeNB,max}(T_2)$ and $\hat{P}_{SeNB,max}(T_2)$, are:

$$\hat{P}_{MeNB,max}(T_2) = \gamma_{MeNB}(T_2)\hat{P}_{CMAX}(i), \text{ and}$$

$$\hat{P}_{SeNB,max}(T_2) = \gamma_{SeNB}(T_2)\hat{P}_{CMAX}(i),$$

where $\gamma_{MeNB}(T_2)$ and $\gamma_{SeNB}(T_2)$ are the semi-statically defined fractions defined for the second time period $T_2$ and $\gamma_{MeNB}(T_2) + \gamma_{SeNB}(T_2) = 1$. Notably, in this example, it is assumed that the maximum allowable transmit power level $\hat{P}_{CMAX}(i)$ is also constant during the second time period $T_2$, but the present disclosure is not limited thereto.

The adjustment of the maximum transmit power levels $\hat{P}_{MeNB,max}$ and $\hat{P}_{SeNB,max}$ is expected to be slow (i.e., long T) (e.g., the adjustments may be made semi-statically via some semi-statically signaling such as, for example, Radio Resource Control (RRC) signaling). For example, adjustments may be desired when the wireless device 12 moves from an outdoor environment to an indoor environment, or vice versa. The benefit is that the maximum transmit power levels $\hat{P}_{MeNB,max}$ and $\hat{P}_{SeNB,max}$ can be adjusted over time to match the varying conditions that the wireless device 12 experiences. In some embodiments, the wireless device 12 performs the semi-static adjustment of the maximum transmit power levels $\hat{P}_{MeNB,max}$ and $\hat{P}_{SeNB,max}$ and signals the resulting values for the maximum transmit power levels $\hat{P}_{MeNB,max}$ and $\hat{P}_{SeNB,max}$ to the MeNB 14 and the SeNB 16.

In one example embodiment, for a given time period T, the wireless device 12 tracks an average path loss on the MeNB link (i.e., link k) and the SeNB link (link k'). The wireless device 12 then selects $\hat{P}_{MeNB,max}$ and $\hat{P}_{SeNB,max}$ in proportion to the path loss on MeNB link and the SeNB link in the next time period T. This approach attempts to maintain the same data rate over the two links by allocating proportionally higher power to poorer links to compensate for the path loss.

As another example, for a given time period T, the wireless device 12 tracks the average path loss on the MeNB link and the SeNB link and selects $\hat{P}_{MeNB,max}$ and $\hat{P}_{SeNB,max}$ reversely in proportion to the path loss on the MeNB link and the SeNB link in the next time period T. This approach attempts to maximize the aggregate data rate over the two links by allocating more power to the link with better channel condition.

In other examples, the wireless device 12 may vary the maximum transmit power levels $\hat{P}_{MeNB,max}$ and $\hat{P}_{SeNB,max}$ in time according to other factors such as, for example: (a) uplink interference the wireless device 12 causes, (b) a number of uplink antenna ports that the wireless device 12 uses over the two links, (c) an average number of RBs that the wireless device 12 is assigned, (d) a Quality of Service Class Indicator (QCI) of the bearers on the two links, and/or (e) the number of serving cells configured with uplink transmission on each link.

Figure 19:
FIG. 19 illustrates one example in which semi-statically defined maximum transmit power levels for the MeNB and SeNB links can take two or more levels with a known pattern according to some embodiments of the present disclosure.

A variation of the semi-static power allocation is that within the period T, the maximum transmit power levels $\hat{P}_{MeNB,max}$ and $\hat{P}_{SeNB,max}$ can take two or more levels with a known pattern. One example is illustrated in FIG. 19. This can be useful for handling Discontinuous Transmission (DTX) of the MeNB 14 or the SeNB 16. For example, the higher level is for the subframes that the wireless device 12 may have uplink transmission, and the lower level is for the periods where it is known that there is no uplink transmission. Note that FIG. 19 is only an example. The pattern may have any number of two or more maximum transmit power levels within the time period T.

Figure 20:
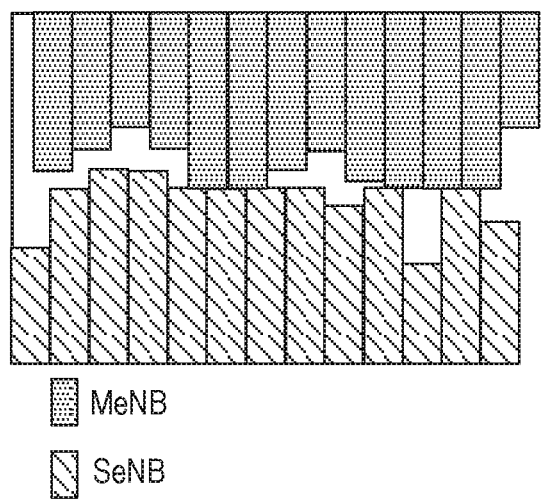
FIG. 20 illustrates one example in which the maximum transmit power levels for the MeNB and SeNB links are applied only when a total calculated transmission power across the links exceeds a maximum allowable transmit power level.

In one alternative embodiment, the maximum transmit power levels $\hat{P}_{MeNB,max}$ and $\hat{P}_{SeNB,max}$ for the links are applied only when a total calculated transmission power across the uplinks to the MeNB 14 and the SeNB 16 exceeds the maximum allowable transmit power level $\hat{P}_{CMAX}(i)$. The semi-static maximum transmit power levels $\hat{P}_{MeNB,max}$ and $\hat{P}_{SeNB,max}$ are not applied when the total calculated transmission power for the MeNB 14 and the SeNB 16 does not exceed the maximum allowable transmit power level $\hat{P}_{CMAX}(i)$. One example is given in FIG. 20.

Figure 21:
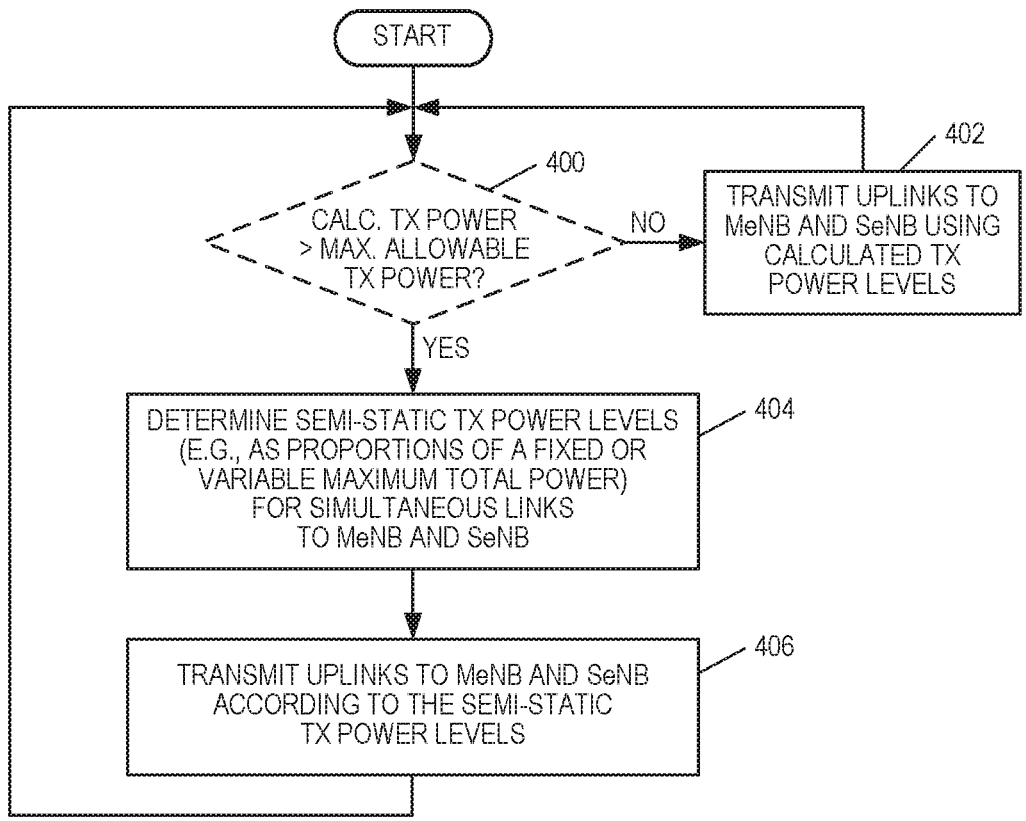
FIG. 21 is a flow chart that illustrates the operation of a wireless device to transit uplink transmissions on the MeNB and SeNB links according to a semi-static uplink power control scheme according to some embodiments of the present disclosure.

FIG. 21 is a flow chart that illustrates the operation of the wireless device 12 to transmit uplink transmissions on the links to the MeNB 14 and the SeNB 16 according to a semi-static uplink power control scheme according to some embodiments of the present disclosure. This process corresponds to at least some of the semi-static embodiments described above. As illustrated, optionally (as indicated by dashed lines), the wireless device 12 determines whether a total calculated transmit power for the wireless device 12 for the MeNB link and the SeNB link is greater than the predefined maximum allowable transmit power level $\hat{P}_{CMAX}$(i) (step 400). If not, the wireless device 12 transmits the uplink transmissions to the MeNB 14 and the SeNB 14 over the respective links using the calculated transmit power levels (step 402), and the process then returns to step 400 if there is scheduled UL transmission to MeNB and/or SeNB. The calculated transmit power levels may be, for example, the transmit power levels calculated (e.g., in the conventional manner) without taking the uplink transmit power level of one link into consideration when calculating the uplink transmit power level of the other link (i.e., when calculating the transmit power levels for the two links separately).

Conversely, if the total calculated transmit power for the wireless device 12 for the MeNB link and the SeNB link is greater than the predefined maximum allowable transmit power level $\hat{P}_{CMAX}$(i), the wireless device 12 determines semi-static maximum transmit power levels $\hat{P}_{MeNB,max}$ and $\hat{P}_{SeNB,max}$ for the MeNB link and the SeNB link, respectively (step 404). As discussed above, in some embodiments, the semi-static maximum transmit power levels $\hat{P}_{MeNB,max}$ and $\hat{P}_{SeNB,max}$ are semi-static in that they are defined according to semi-static fractions $\gamma_{MeNB}$ and $\gamma_{SeNB}$ of the maximum allowable transmit power level $\hat{P}_{CMAX}$(i), where the maximum allowable transmit power level $\hat{P}_{CMAX}$(i) may be static or variable. Notably, in this embodiment, the maximum transmit power levels $\hat{P}_{MeNB,max}$ and $\hat{P}_{SeNB,max}$ (or equivalently the fractions $\gamma_{MeNB}$ and $\gamma_{SeNB}$) are updated for each time period T. The wireless device 12 then transmits uplink transmissions to the MeNB 14 and the SeNB 16 over the corresponding links according to the maximum transmit power levels $\hat{P}_{MeNB,max}$ and $\hat{P}_{SeNB,max}$ determined in step 404 (step 406). The process then returns to step 400 and is repeated. In some embodiments, the process is repeated for each subframe of each of the two links.

Figure 22:
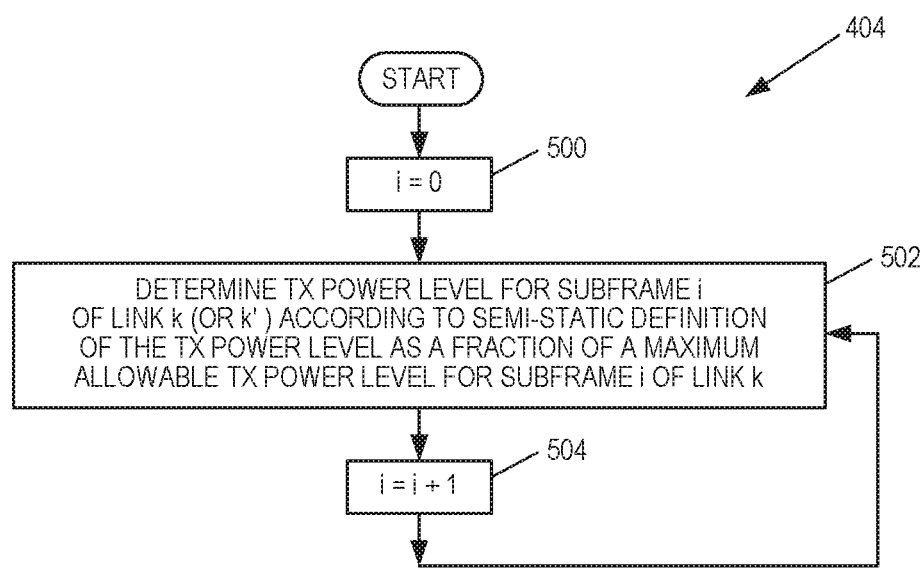
FIG. 22 illustrates one of the steps of FIG. 21 in more detail according to some embodiments of the present disclosure.

FIG. 22 illustrates step 404 of FIG. 21 in more detail according to some embodiments of the present disclosure. FIG. 22 illustrates the manner in which the maximum transmit power level $\hat{P}_{MeNB,max}$ is determined according to a semi-static definition of the maximum transmit power level $\hat{P}_{MeNB,max}$ as a fraction of the maximum allowable transmit power level $\hat{P}_{CMAX}$(i). The same process can be used to determine the maximum transmit power level $\hat{P}_{SeNB,max}$. As illustrated, a subframe index is first initialized (e.g., to a value of 0) (step 500). The wireless device 12 then determines the maximum transmit power level $\hat{P}_{MeNB,max}$ for subframe i of the link to the MeNB 14, which is referred to herein as link k, according to a semi-static definition of the maximum transmit power level $\hat{P}_{MeNB,max}$ as a fraction of the maximum allowable transmit power level $\hat{P}_{CMAX}$(i) of the wireless device 12 for subframe i (step 502). The index i is then incremented (step 504), and the process then returns to step 502. In this manner, the wireless device 12 determines the maximum transmit power level $\hat{P}_{MeNB,max}$ for each subframe i transmitted on link k (i.e., the link to the MeNB 14).

Using the same process, the wireless device 12 determines the maximum transmit power level $\hat{P}_{SeNB,max}$ for each subframe i transmitted on link k' (i.e., the link to the SeNB 16) according to a semi-static definition of the maximum transmit power level $\hat{P}_{SeNB,max}$ as a fraction of the maximum allowable transmit power level for the subframe i transmitted on link k'. Notably, for this discussion, it is assumed that the maximum allowable transmit power level is determined by taking into account the requirements of subframe i to be transmitted on link k and the requirements of subframe i transmitted on link k'.

Figure 23:
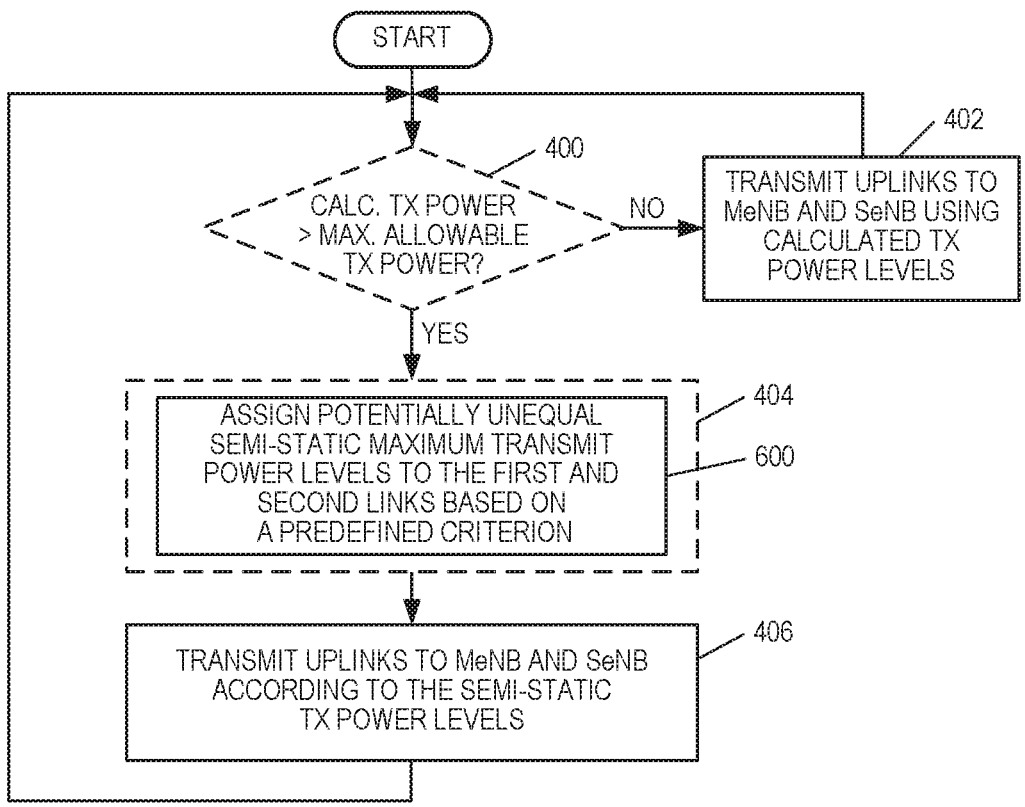
FIG. 23 illustrates the process of FIG. 21 in which the wireless device determines the maximum transmit power levels for the MeNB and SeNB links by semi-statically assigning values to the maximum transmit power levels based on a defined criterion according to some embodiments of the present disclosure.

As discussed above, in some embodiments, the wireless device 12 semi-statically assigns the maximum transmit power levels $\hat{P}_{MeNB,max}$ and $\hat{P}_{SeNB,max}$ based on a criterion such as, for example, (a) uplink interference the wireless device 12 causes, (b) a number of uplink antenna ports that the wireless device 12 uses over the two links, (c) an average number of RBs that the wireless device 12 is assigned, (d) a QCI of the bearers on the two links, and/or (e) the number of serving cells configured with uplink transmission on each link. In this regard, FIG. 23 illustrates the process of FIG. 21 in which the wireless device 12 determines the maximum transmit power levels $\hat{P}_{MeNB,max}$ and $\hat{P}_{SeNB,max}$ by semi-statically assigning (potentially unequal) values to the maximum transmit power levels $\hat{P}_{MeNB,max}$ and $\hat{P}_{SeNB,max}$ based on a defined criterion according to some embodiments of the present disclosure.

More specifically, as illustrated, the wireless device 12 determines the maximum transmit power levels $\hat{P}_{MeNB,max}$ and $\hat{P}_{SeNB,max}$ (step 404) by assigning (potentially unequal) semi-static values as the maximum transmit power levels $\hat{P}_{MeNB,max}$ and $\hat{P}_{SeNB,max}$ based on a predefined criterion (step 600). As discussed above, the predefined criterion may be, for example, (a) uplink interference the wireless device 12 causes, (b) a number of uplink antenna ports that the wireless device 12 uses over the two links, (c) an average number of RBs that the wireless device 12 is assigned, (d) a QCI of the bearers on the two links, and/or (e) the number of serving cells configured with uplink transmission on each link. In some embodiments, more than one of these criteria may be considered.

Thus far, the discussion has focused on static and semi-static configuration of the maximum transmit power levels $\hat{P}_{MeNB,max}$ and $\hat{P}_{SeNB,max}$. The discussion will now turn to embodiments in which the configuration of the maximum transmit power levels $\hat{P}_{MeNB,max}$ and $\hat{P}_{SeNB,max}$ is dynamic. Like in the embodiments discussed above, uplink power control is provided for the scenario where the wireless device 12 has two connections, or links, to two network nodes, respectively. Each connection, or link, may be further composed of one or more serving cells associated with the wireless device 12. In particular, a Master Cell Group (MCG) is a group of serving cells associated with the MeNB 14, and a Secondary Cell Group (SCG) is a group of serving cells associated with the SeNB 16.

Figure 24:
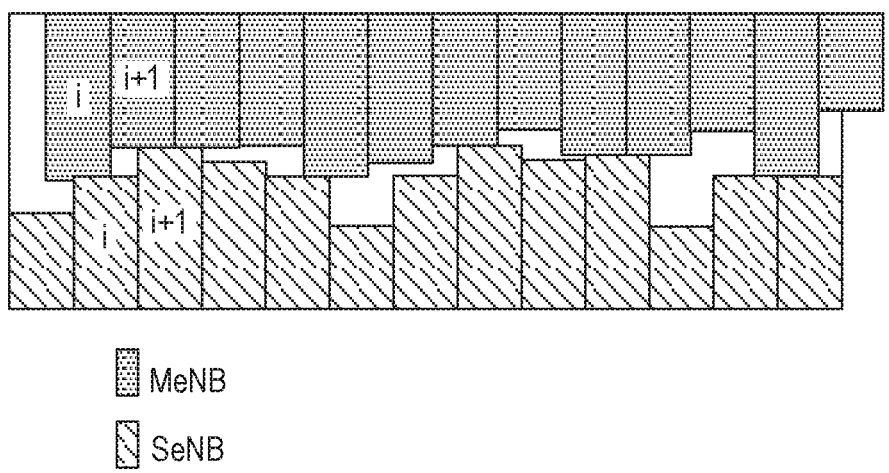
FIG. 24 illustrates one example of dynamic configuration of the maximum transmit power levels for the MeNB and SeNB links according to some embodiments of the present disclosure.

One example of dynamic configuration of the maximum transmit power levels $\hat{P}_{MeNB,max}$ and $\hat{P}_{SeNB,max}$ is illustrated in FIG. 24. As illustrated, for the asynchronous case where the subframe boundaries on the two links are not aligned, the wireless device 12 determines the maximum transmission power $\hat{P}_{MeNB,max}$ for each subframe i on the MeNB link (link k) by taking into consideration the used transmission power in one or more overlapping subframes of the SeNB link (link k'), and vice versa. As illustrated, each subframe on the MeNB link has two overlapping subframes on the SeNB link. Likewise, each subframe on the SeNB link has two overlapping subframes on the MeNB link. For example, subframe i on the SeNB link is partially overlapped by subframes i and i+1 on the MeNB link. It is important to note here that although for simplicity, MeNB and SeNB subframes indices are both denoted with variable 'i', 'i−1', etc., in general MeNB and SeNB subframes may have substantially different subframe numbering and be denoted with two different variables. For example, in general subframes of MeNB is denoted with index E while subframes of SeNB is denoted with index F. As discussed below in detail, in some embodiments, the transmission power on both overlapping subframes is taken into consideration. In other embodiments, the transmission power of only the earlier (in time) of the two overlapping subframes is taken into consideration. Further, in some embodiments, the dynamic transmit power control for a particular subframe of a link k, k' is performed only if the total calculated transmit power for the subframe and its overlapping subframe(s) on the other link exceeds the maximum allowable transmit power for the wireless device 12.

More specifically, in some embodiments, the wireless device 12 follows the procedure outline below to determine the maximum transmit power levels $\hat{P}_{MeNB,max}$ and $\hat{P}_{SeNB,max}$ that the wireless device 12 uses for uplink transmission on the MeNB link (denoted as link k) and the SeNB link (denoted as link k'), respectively. For brevity, it is assumed in the procedure below that only one cell in each link has configured uplink, and only one uplink channel is sent in an uplink subframe (e.g., Physical Uplink Control Channel (PUCCH) or Physical Uplink Shared Channel (PUSCH)).

Step 1: For a subframe i of the link k, the wireless device 12 calculates a value $\hat{P}^k(i-1)$ which takes into account the transmission power limits according to the first slot of subframe i on link k. Notably, while the term "slot" is used, it is important to point out that, as would be understood by one of ordinary skill in the art, the value $\hat{P}^k(i-1)$ is more precisely a maximum transmit power for subframe i of the link k when taking into account the transmission power of the overlapping subframe i on link k' (i.e., the earlier of the two subframes on link k' that partially overlap the subframe i on link k). This overlap may be any amount of overlap depending on the time offset between the subframe boundaries of the two links k and k'. In one specific case or example, the timing offset is such that the overlap between subframe i on link k and the overlapping subframe i on link k' is equal to a slot. However, the overlap is not limited thereto. As such, in the discussion below, the subframe on the link k' that is said to overlap the first slot of subframe i on link k is to be understood as the subframe on the link k' having: (a) a starting subframe boundary that is before (in time) the starting subframe boundary of the subframe i on link k and (b) an ending subframe boundary that is after the starting subframe boundary of subframe i on link k but before the ending subframe boundary of subframe i on link k. Conversely the subframe on link k' that is said to overlap the second slot of subframe i on link k is to understood as the subframe on link k' having: (a) a starting subframe boundary that is after the starting subframe boundary of subframe i on link k but before the ending subframe boundary of subframe i on link k and (b) and ending subframe boundary that is after the ending subframe boundary of subframe i on link k.

If there is an uplink transmission on the other link k' overlapping the first slot of subframe i on link k, calculate $$\hat{P}^k(i-1)=\min(\hat{P}_{SL}^k(i),\hat{P}_{CMAX}(i)-\hat{P}_{used}^{k'}(i-1)),$$

where $\hat{P}_{CMAX}(i)$ refers to the linear value of the total configured maximum output power $\hat{P}_{CMAX}$, $\hat{P}_{used}^{k'}(i-1)$ refers to the power level used by the other link k' on the subframe that overlaps the first slot of the subframe i on link k, $\hat{P}_{SL}^k(i)$ is the calculated linear power value for the link k assuming link k is the single link on which the wireless device 12 has uplink transmission in the entire duration of subframe i of link k (i.e., assuming non-overlap with link k'). Thus, $\hat{P}^k(i-1)$ is the lesser of the calculated linear power value for the link k assuming link k is the single link on which the wireless device 12 has uplink transmission in the entire duration of subframe i of link k and unused portion of the maximum output power $\hat{P}_{CMAX}(i)$ for subframe i of link k when considering the used power in the other link k' on the subframe that overlaps the first slot of the subframe i on link k. If there is no transmission on the other link (link k') overlapping the first slot of subframe i of link k, $\hat{P}_{used}^{k'}(i-1)=0$ and $\hat{P}^k(i-1)=\hat{P}_{SL}^k(i)$.

Step 2: For the subframe i of link k, the wireless device 12 calculates value $\hat{P}^k(i)$ which takes into account the transmission power limits according to the second slot of subframe i on link k. If there is an uplink transmission on the other link k' overlapping the second slot of subframe i on link k, $\hat{P}^k(i)$ is calculated as if subframe i of the link k is aligned in subframe boundary with the overlapping subframe of link k'. In this step, priority of the uplink channel types between the two links is taken into account. If there is no uplink transmission on the other link k' overlapping the second slot of subframe i on link k, $\hat{P}^k(i)=\hat{P}_{SL}^k(i)$.

Step 3: The final power level (i.e., $\hat{P}_{MeNB,max}$ or $\hat{P}_{SeNB,max}$) that the wireless device 12 selects for subframe i of link k is $\hat{P}_*^k(i)=\min(\hat{P}^k(i-1), \hat{P}^k(i))$. This power level represents the total available power for the given link, i.e. in the example of one MeNB and SeNB. It represents the total available power for all carriers on either of these links. For example, if link k is configured with two uplink component carriers, then the total available power of link k is further shared by the transmission over the two uplink carriers. Note that if subframe boundary of the two links are aligned (synchronized network with one Timing Advance Group (TAG)), then the calculation degenerates into $\hat{P}_*^k(i)=\hat{P}_{SL}^k(i)$. This same process is repeated for each subframe of the link k. Likewise, this process is performed to determine $P_{SeNB,max}$ for link k'.

As one simplification, step 2 and step 3 can be omitted. The possible overlapping between the second slot of subframe i for link k and the first slot of subframe i+1 for link k' is not considered at all, then the final power level degenerates into $\hat{P}_*^k(i)=\hat{P}^k(i-1)$.

Note also that if Sounding Reference Signal (SRS) on one link overlaps with a higher-priority transmission on the other link, SRS may be dropped rather than being power scaled.

The steps above can be modified to account for the variation where two uplink channels (e.g., PUCCH and PUSCH) are allowed in a same uplink subframe for a given link. If there is only one uplink channel on link k (i.e., no simultaneous PUSCH and PUCCH), $\hat{P}_{SL}^k(i)$ is the calculated linear power value for the uplink channel (PUSCH or PUCCH) on link k assuming non-overlap with link k'. $\hat{P}_*^k(i)$ is the final power level of the uplink channel on link k. This is the scenario assumed in description of steps 1 and 2. Conversely, if there are two simultaneous uplink channels on link k (e.g., simultaneous PUSCH and PUCCH in a subframe), $\hat{P}_{SL}^k(i)$ is the sum of the calculated linear power value for the uplink channels (PUSCH and PUCCH) on link k assuming non-overlap with link k'. In most cases, $\hat{P}_{SL}^k(i)=\hat{P}_{CMAX}(i)$. $\hat{P}^k(i)$ obtained in step 2 is the maximum power for both uplink channels on link k. To further allocate $\hat{P}_*^k(i)$ between two simultaneous uplink channels, the final power level of each individual uplink channel is calculated with the existing formulae taking $\hat{P}_*^k(i)$ as $\hat{P}_{CMAX}(i)$.

In the description above, it is assumed that each link has only one serving cell configured with uplink transmission (LTE Release 12). Further details for scenarios where each link configures multiple cells with uplink transmission (LTE Release 13 and later) are desirable. Steps 1-3 above can be modified to account for such case.

In the description above, it is assumed that each link has only one serving cell configured with uplink transmission. However, steps 1-3 above can be extended to the case where each link configures multiple cells with uplink transmissions.

Step 1: For a subframe i of a link k, the wireless device 12 calculates value $\hat{P}_c^k(i-1)$ for serving cell c which takes into account the transmission power limits according to the first slot of subframe i on link k. If there is an uplink transmission on the other link k' overlapping the first slot of subframe i on link k, calculate $$\hat{P}_{sum}^k(i-1) = \min\left(\sum_c \hat{P}_c^k(i-1), \hat{P}_{CMAX}(i) - \sum_{c'} \hat{P}_{c'}^{k'}(i-1)\right),$$

where $\hat{P}_{CMAX}(i)$ refers to the linear value of the total configured maximum output power $P_{CMAX}$ of the wireless device 12, $P_{c'}^{k'}(i-1)$ refers to the power level used by serving cell c' in the other link k' that overlaps the first slot of the subframe i, $\hat{P}_c^k(i-1)$ is the calculated linear power value for serving cell c in the link k assuming link k is the single link on which the wireless device 12 has uplink transmission in the entire duration of subframe i (i.e., assuming non-overlap with link k'). If there is no transmission on the other link (link k') overlapping the first slot of subframe i of link k, $$\sum_{c'} \hat{P}_{c'}^{k'}(i-1) = 0 \text{ and } \hat{P}_{sum}^k(i-1) = \sum_c \hat{P}_c^k(i-1).$$

Step 2: For subframe i of link k, the wireless device 12 calculates a value $\hat{P}_{sum}^k(i)$ which takes into account the transmission power limits according to the second slot of subframe i on link k. If there is an uplink transmission on the other link k' overlapping the second slot of subframe i on link k, $\hat{P}_{sum}^k(i)$ is calculated as if subframe i of the link k is aligned in subframe boundary with the overlapping subframe of link k'. In this step, priority of uplink channel types between the two links is taken into account. If there is no uplink transmission on the other link k' overlapping the second slot of subframe i on link k, $$\hat{P}_{sum}^k(i) = \sum_c \hat{P}_c^k(i).$$

Step 3: The final total power level that the wireless device 12 uses for subframe i of link k is $\hat{P}_*^k(i)=\min(\hat{P}_{sum}^k(i-1), \hat{P}_{sum}^k(i))$. If $\hat{P}_*^k(i)=\hat{P}_{sum}^k(i-1)$, the final power level for serving cell c in subframe i of link k is $\hat{P}_c^k(i-1)$ as determined in step 1; else if $\hat{P}_*^k(i)=\hat{P}_{sum}^k(i)$, the final power level serving cell c in subframe i of link k is $\hat{P}_c^k(i)$ as determined in step 2.

The following is one example of the process described above. For SeNB subframe i:

Step 1. $\hat{P}^{SeNB}(i-1)=\hat{P}_{SL}^{SeNB}(i)$, where $\hat{P}_{SL}^{seNB}(i)$ is the calculated power value of subframe i of SeNB link assuming non-overlap with MeNB;

Step 2. $\hat{P}^{SeNB}(i)$ is calculated assuming SeNB subframe i is aligned with MeNB subframe i. In this step, priority of uplink channel types between MeNB and SeNB links is considered.

Step 3. Final power of SeNB subframe i is:

$$\hat{P}_*^{SeNB}(i)=\min(\hat{P}^{SeNB}(i-1),\hat{P}^{SeNB}(i)).$$

For MeNB subframe i:

Step 1. $\hat{P}^{MeNB}(i-1)=\min\ (\hat{P}_{SL}^{MeNB}(i),\hat{P}_{CMAX}(i)-\hat{P}_*^{SeNB}(i))$, where $\hat{P}_{SL}^{MeNB}(i)$ is the calculated power value of subframe i of MeNB link assuming non-overlap with SeNB.

Step 2. $\hat{P}^{MeNB}(i)$ is calculated assuming MeNB subframe i is aligned with SeNB subframe (i+1). In this step, priority of uplink channel types between MeNB and SeNB links is considered.

Step 3. Final power of MeNB subframe i is $$\hat{P}_*^{MeNB}(i)=\min(\hat{P}^{MeNB}(i-1),\hat{P}^{MeNB}(i)).$$

Figure 25:
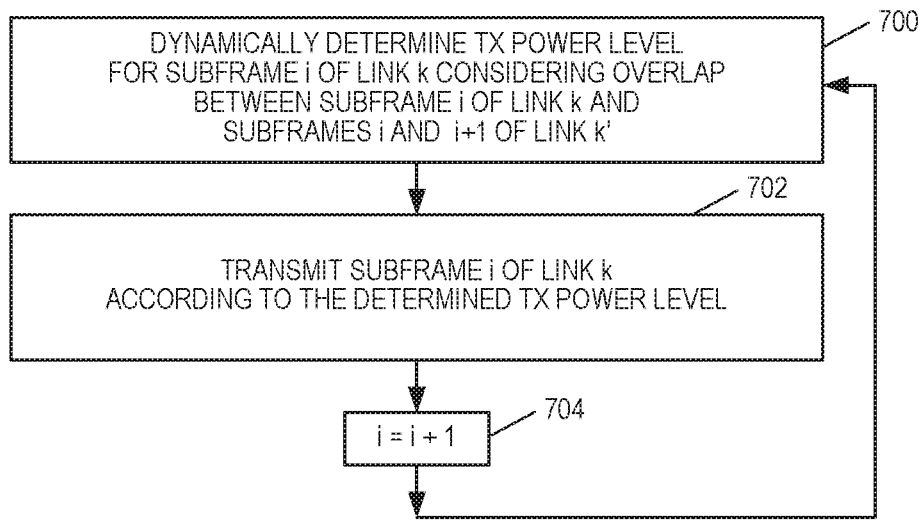
FIG. 25 is a flow chart that illustrates the operation of the wireless device to dynamically determine the maximum transmit power levels for the MeNB and SeNB links and to transmit uplink transmissions on the link k according to the determined maximum transmit power levels according to some embodiments of the present disclosure.
Figure 26:
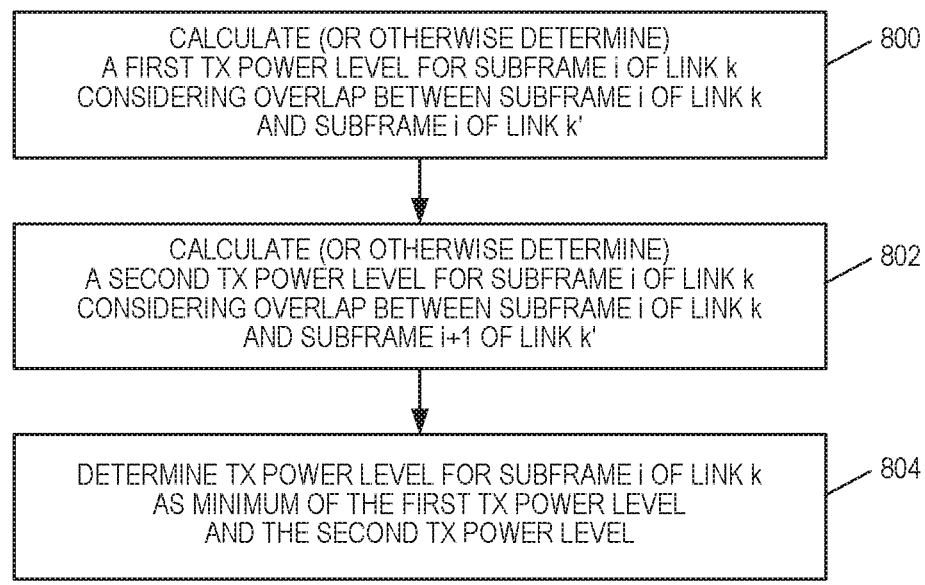
FIG. 26 is a flow chart illustrating the operation of the wireless device according to some dynamic power level configuration embodiments of the present disclosure.

FIGS. 25 and 26 are flow charts that illustrate some embodiments of the dynamic transmit power configuration schemes described above. More specifically, FIG. 25 is a flow chart that illustrates the operation of the wireless device 12 to dynamically determine the maximum transmit power levels $\hat{P}_{MeNB,max}$ and to transmit uplink transmissions on the link k according to the determined maximum transmit power level $\hat{P}_{MeNB,max}$ according to some embodiments of the present disclosure. As illustrated, the wireless device 12 determines the maximum transmit power level $\hat{P}_{MeNB,max}$ for subframe i of link k taking into consideration the overlap between subframe i of link k and subframes i and i+1 of link k' using, e.g., any one of the dynamic processes described above (step 700). The wireless device 12 transmits an uplink transmission on subframe i of link k according to the determined maximum transmit power level $\hat{P}_{MeNB,max}$ (step 702). The wireless device 12 then increments the subframe index i (step 704), and the process is then repeated for the next subframe on link k. This same process may also be used in the same manner for the subframes of the link k'.

FIG. 26 is a flow chart illustrating the operation of the wireless device 12 according to some embodiments of steps 1-3 of the dynamic process described above. As illustrated, the wireless device 12 calculates (or otherwise determines) a first transmit power level for subframe i of link k considering the overlap between subframe i of link k and subframe i of link k' (step 800). The wireless device 12 also calculates (or otherwise determines) a second transmit power level for subframe i of link k considering the overlap between subframe i of link k and subframe i+1 of link k' (step 802). The wireless device 12 then determines the maximum transmit power level $\hat{P}_{MeNB,max}$ for subframe i of link k as the minimum of the first and second power levels calculated in steps 800 and 802 (step 804). This process is repeated for each subframe of link k. In the same manner, this process can be used to determine the maximum transmit power level $\hat{P}_{SeNB,max}$ for each subframe of link k'.

In the embodiments of the dynamic scheme described above, the wireless device 12 takes into consideration the overlap between the subframe i of one link with both overlapping subframes of the other link. In other embodiments, only the overlap with the earliest (in time) of the two overlapping subframes is considered. The other overlapping subframe is not considered.

Figure 27:
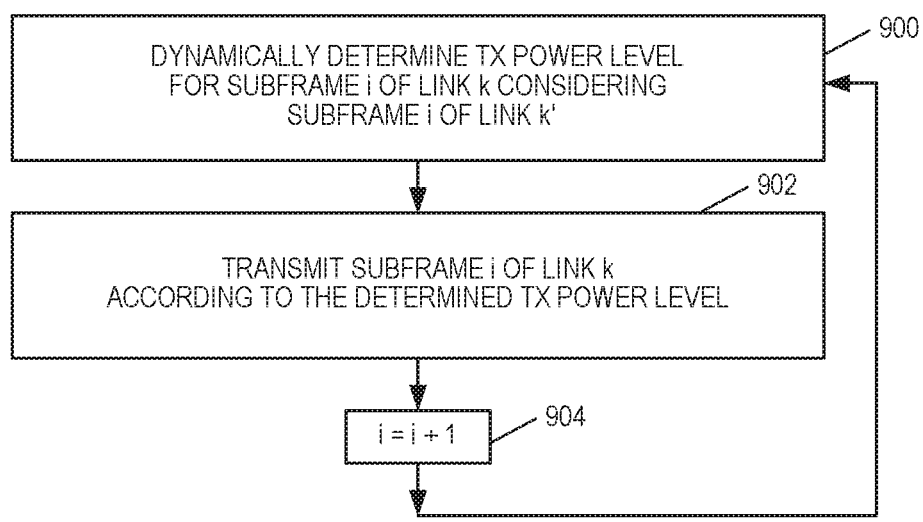
FIG. 27 is a flow chart that illustrates the operation of the wireless device according to some embodiments in which only the earlier of two overlapping subframes is considered.

In this regard, FIG. 27 is a flow chart that illustrates the operation of the wireless device 12 according to some embodiments in which only the earlier of the two overlapping subframes is considered. More specifically, FIG. 27 is a flow chart that illustrates the operation of the wireless device 12 to dynamically determine the maximum transmit power levels $\hat{P}_{MeNB,max}$ and to transmit uplink transmissions on the link k according to the determined maximum transmit power level $\hat{P}_{MeNB,max}$ according to some embodiments of the present disclosure. As illustrated, the wireless device 12 determines the maximum transmit power level $\hat{P}_{MeNB,max}$ for subframe i of link k taking into consideration only the overlap between subframe i of link k and subframe i of link k' (i.e., the earlier of the two overlapping subframes of link k') using, e.g., any one of the dynamic processes described above (step 900). The wireless device 12 transmits an uplink transmission on subframe i of link k according to the determined maximum transmit power level $\hat{P}_{MeNB,max}$ (step 902). The wireless device 12 then increments the subframe index i (step 904), and the process is then repeated for the next subframe on link k. This same process may also be used in the same manner for the subframes of the link k'.

The discussion will now turn to some other dynamic uplink power control schemes according to some other embodiments of the present disclosure. In general, in these embodiments, PUCCH power control and PUSCH power control are provided. The PUSCH transmit power level is scaled if the total combined transmit power across both links for all channels is greater than the maximum allowable transmit power.

Figure 28A:
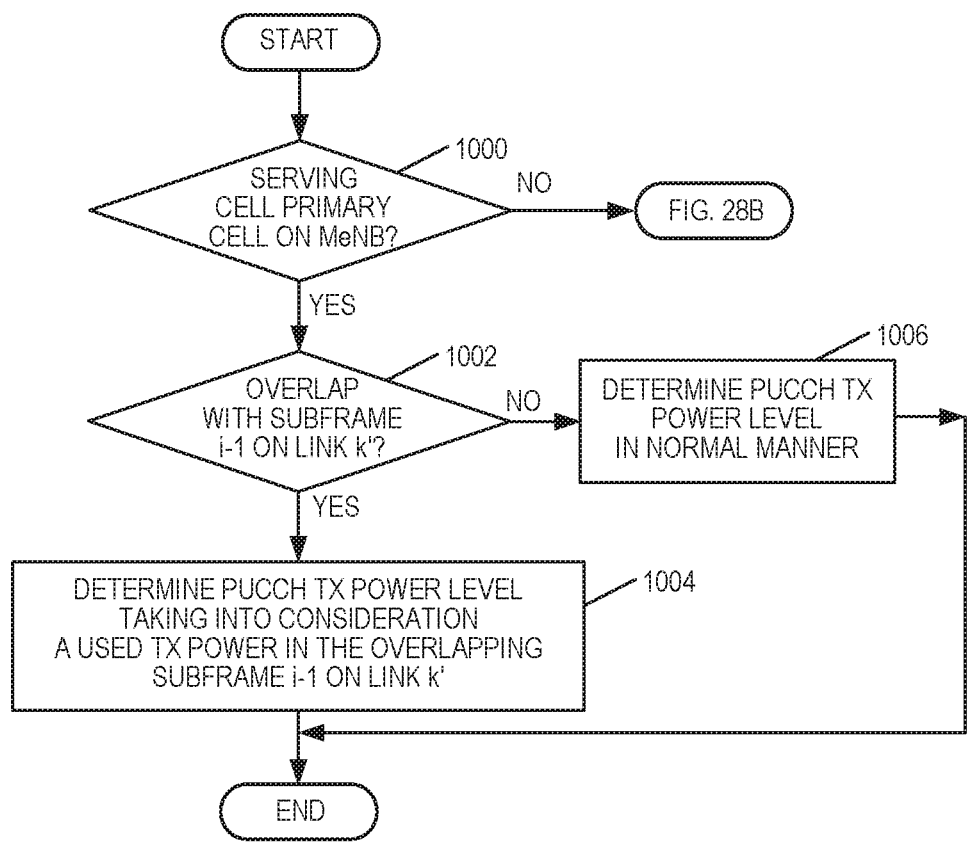
FIGS. 28A and 28B illustrate a process for determining PUCCH transmit power level according to some embodiments of the present disclosure.
Figure 28B:
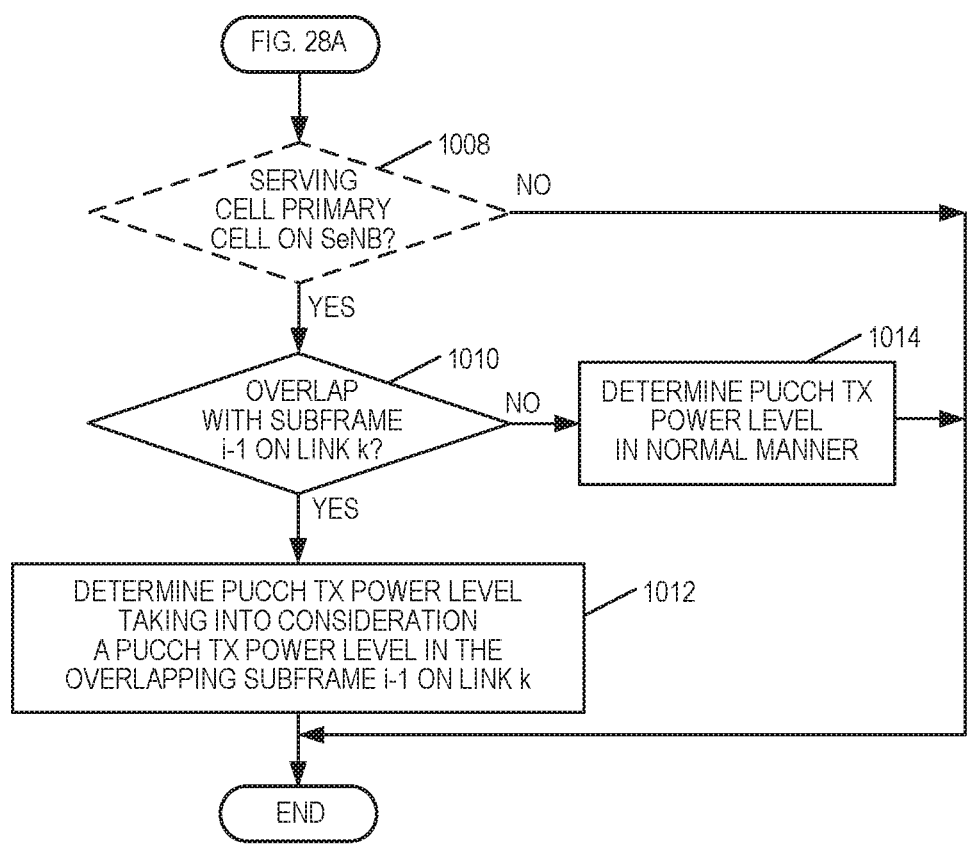

PUCCH power control: The transmission power of PUCCH on either the MeNB link or the SeNB link are, in some embodiments, determined as illustrated in FIGS. 28A and 28B and described as follows. If serving cell c is the primary cell (i.e., the cell of the primary component carrier when using carrier aggregation) on the MeNB 14 (step 1000) and if there will be an overlapping transmission in time from the subframe i−1 on the SeNB link (i.e., link k') (step 1002), the $P_{PUCCH}$ transmit power (i.e., transmit power for PUCCH) for subframe i on the MeNB link is determined taking into consideration used transmit power in the overlapping subframe i−1 on link k' (step 1004). In particular, in some embodiments, the PUCCH transmit power for subframe i on the MeNB link is determined according to:

$$P_{PUCCH,MeNB}(i) = \min\left\{ \begin{array}{c} \min\left( \begin{array}{c} P_{CMAX,c}(i), P_{CMAX}(i) - \sum_c P_{PUSCH,c,SeNB}(i-1) - \\ P_{PUCCH,SeNB}(i-1) \end{array} \right), \\ P_{0\_PUCCH,MeNB} + PL_c + h(n_{CQI}, n_{HARQ}, n_{SR}) + \\ \Delta_{F\_PUCCH,MeNB}(F) + \Delta_{TxD,MeNB}(F') + g(i) \end{array} \right\} [dBm]$$

In this equation, the top term in the outermost minimization function is to consider the used transmit power in the overlapping subframe i−1 of link k' (i.e., the SeNB link). In this example, the used transmit power is the PUSCH transmit power and the PUCCH transmit power used for the SeNB link. Thus, the top term (which is itself a minimization function) returns the minimum of: (a) the maximum allowable transmit power for the subframe i and (b) a difference between the maximum allowable transmit power and the total transmit power already used (both PUSCH and PUCCH) in the overlapping subframe i−1 of the SeNB link. The bottom term in the equation above is the conventional PUCCH transmit power. Thus, the PUCCH transmit power for subframe i on the MeNB link is the minimum of: (a) $P_{CMAX,c}(i)$, (b) the unused amount of $P_{CMAX}(i)$ when taking into consideration the total transmit power already used in the overlapping subframe i−1 of the SeNB link, and (c) the conventional PUCCH transit power, which does not take into consideration any overlapping subframes of the SeNB link.

If there is no overlap between subframe i on the MeNB link and subframe i−1 on the SeNB link, the wireless device 12 determines the PUCCH transmit power for subframe i of the MeNB link in a normal or conventional manner (step 1006). In one particular example, the wireless device 12 determines the PUCCH transmit power for subframe i of the MeNB link as:

$$P_{PUCCH,MeNB}(i) = \min\left\{ \begin{array}{c} P_{CMAX,c}(i), \\ P_{0\_PUCCH,MeNB} + PL_c + h(n_{CQI}, n_{HARQ}, n_{SR}) + \\ \Delta_{F\_PUCCH,MeNB}(F) + \Delta_{TxD,MeNB}(F') + g(i) \end{array} \right\} [dBm]$$

Returning to step 1000, if serving cell c is not the primary cell on the MeNB 14 but is the primary cell on the SeNB 16 (step 1008) and if the there is an overlap with subframe i−1 on the MeNB link (link k) (step 1010), the wireless device 12 determines the $P_{PUCCH}$ transmit power (i.e., transmit power for PUCCH) for subframe i on the SeNB link taking into consideration used transmit power in the overlapping subframe i−1 on link k (step 1012). In particular, in some embodiments, the PUCCH transmit power for subframe i on the SeNB link is determined according to:

$$P_{PUCCH,SeNB}(i) = \min\left\{ \begin{array}{c} \min\left( \begin{array}{c} P_{CMAX,c}(i), P_{CMAX}(i) - \sum_c P_{PUSCH,c,MeNB}(i-1) - \\ P_{PUCCH,MeNB}(i-1) \end{array} \right), \\ P_{0\_PUCCH,SeNB} + PL_c + h(n_{CQI}, n_{HARQ}, n_{SR}) + \\ \Delta_{F\_PUCCH,SeNB}(F) + \Delta_{TxD,SeNB}(F') + g(i) \end{array} \right\} [dBm]$$

In this equation, the top term in the outermost minimization function is to consider the used transmit power in the overlapping subframe i−1 of link k (i.e., the MeNB link). In this example, the used transmit power is the PUSCH transmit power and the PUCCH transmit power used for the MeNB link. Thus, the top term (which is itself a minimization function) returns the minimum of: (a) the maximum allowable transmit power for the subframe i and (b) a difference between the maximum allowable transmit power and the total transmit power already used (both PUSCH and PUCCH) in the overlapping subframe i−1 of the MeNB link. The bottom term in the equation above is the conventional PUCCH transmit power. Thus, the PUCCH transmit power for subframe i on the SeNB link is the minimum of: (a) $P_{CMAX,c}(i)$, (b) the unused amount of $P_{CMAX}(i)$ when taking into consideration the total transmit power already used in the overlapping subframe i−1 of the MeNB link, and (c) the conventional PUCCH transit power, which does not take into consideration any overlapping subframes of the MeNB link.

If there is no overlap between subframe i on the SeNB link and subframe i−1 on the MeNB link, the wireless device 12 determines the PUCCH transmit power for subframe i of the SeNB link in a normal or conventional manner (step 1014). In one particular example, the wireless device 12 determines the PUCCH transmit power for subframe i of the SeNB link as:

$$P_{PUCCH,SeNB}(i) = \min\left\{\begin{array}{l}P_{CMAX,c}(i), \\ P_{0\_PUCCH,SeNB} + PL_c + h(n_{CQI}, n_{HARQ}, n_{SR}) + \\ \Delta_{F\_PUCCH,SeNB}(F) + \Delta_{TxD,SeNB}(F') + g(i)\end{array}\right\}[dBm]$$

This process can be repeated by the wireless device 12 for each subframe of both the MeNB link and the SeNB link.

Figure 29:
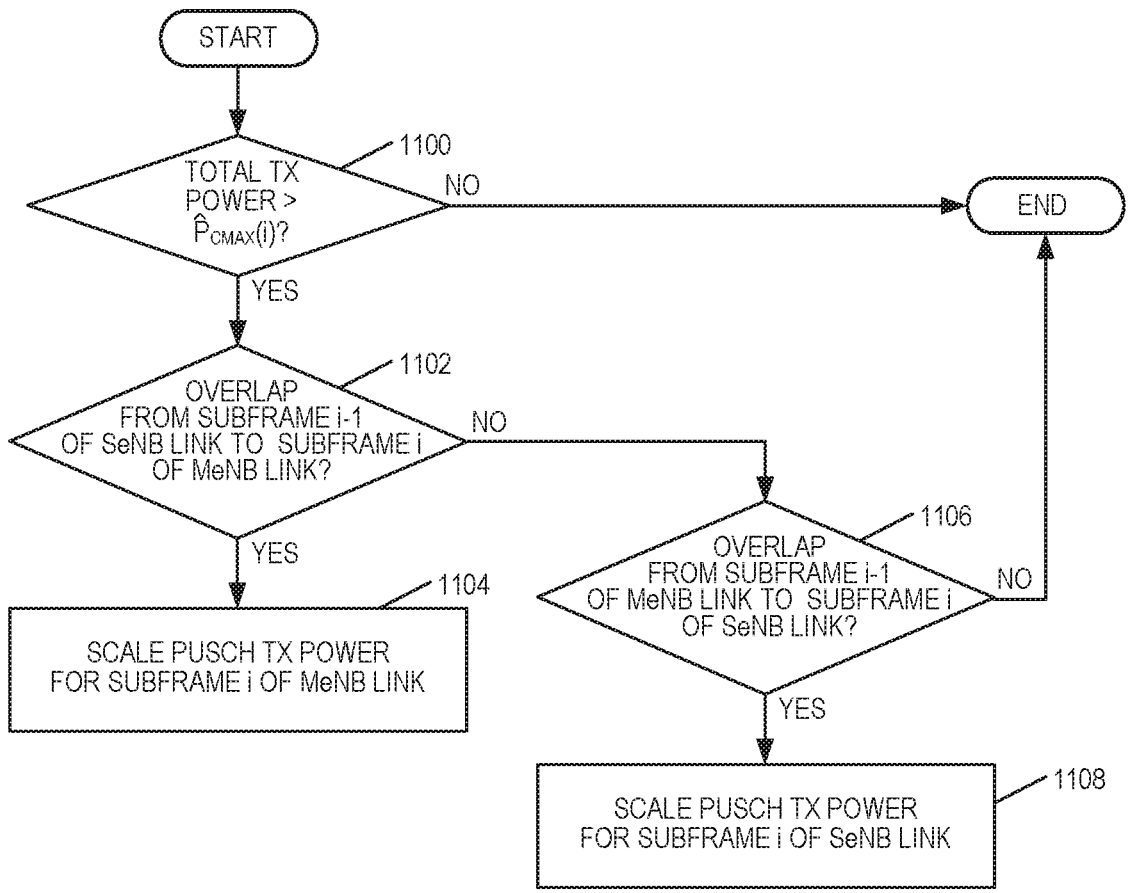
FIG. 29 illustrates a process for determining Physical Uplink Shared Channel (PUSCH) transmit power level according to some embodiments of the present disclosure.

PUSCH power control: The transmission power of PUSCH on either the MeNB link or the SeNB link are, in some embodiments, determined as illustrated in FIG. 29 and described as follows. In general, FIG. 29 illustrates a process in which the PUSCH transmit power of one link is scaled by taking into consideration transmit power in an earlier overlapping subframe of the other link. If the total transmit power of the wireless device 12 for subframe i (the MeNB link or the SeNB link) would exceed the maximum allowable transmit power $\hat{P}_{CMAX}(i)$ (step 1100) and if there will be an overlapping transmission in time from subframe i−1 on the SeNB link to subframe i on the MeNB link (step 1102), the wireless device 12 scales the PUSCH transmit power level $\hat{P}_{PUSCH,c}(i)$ for the serving cell c on the MeNB link in subframe i (step 1104). In some embodiments, the wireless device 12 scales the PUSCH transmit power level $\hat{P}_{PUSCH,c}(i)$ for the serving cell c on the MeNB link in subframe i such that the following condition is satisfied:

$$\sum_c w_1(i) \cdot \hat{P}_{PUSCH,c}(i) \le$$

$$\left(\left(\hat{P}_{CMAX}(i) - \sum_c \hat{P}_{PUSCH,c,SeNB}(i-1) - \hat{P}_{PUCCH,SeNB}(i-1)\right)\right)$$

where $w_1(i)$ is the scaling factor.

Otherwise, if there will be an overlapping transmission in time from subframe i−1 on the MeNB link to subframe i on the SeNB link (step 1106), the wireless device 12 scales the PUSCH transmit power level $\hat{P}_{PUSCH,c}(i)$ for the serving cell c on the SeNB link in subframe i (step 1108). In some embodiments, the wireless device 12 scales the PUSCH transmit power level $\hat{P}_{PUSCH,c}(i)$ for the serving cell c on the SeNB link in subframe i such that the following condition is satisfied:

$$\sum_c w_1(i) \cdot \hat{P}_{PUSCH,c}(i) \le$$

$$\left(\left(\hat{P}_{CMAX}(i) - \sum_c \hat{P}_{PUSCH,c,MeNB}(i-1) - \hat{P}_{PUCCH,MeNB}(i-1)\right)\right)$$

This process of FIG. 29 illustrates that the PUSCH transmission of the later subframe i of one link takes at most the leftover power after subframe (i−1) of the other link. This process may be useful by itself if there is no PUCCH in subframe i in parallel with PUSCH of subframe i. In that case, only the overlap needs to be addressed.

Figure 30:
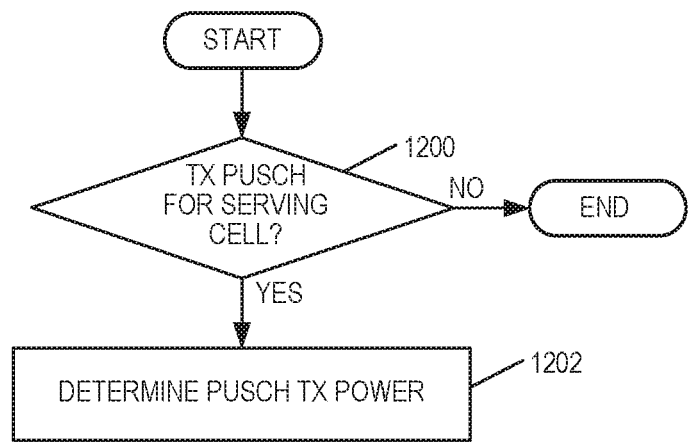
FIG. 30 illustrates a process for determining PUSCH transmit power level according to some other embodiments of the present disclosure.

The wireless device 12 may determine the PUSCH transmit power in other manners. For instance, FIG. 30 and the following text describe one example of a process by which the wireless device 12 determines the PUSCH transmit power. As illustrated in FIG. 30, if the wireless device 12 transmits PUSCH for the serving cell c on either MeNB link or the SeNB link (step 1200), then the PUSCH transmit power level $P_{PUSCH,c}(i)$ for the wireless device 12 for PUSCH transmission in subframe i for the serving cell c is determined (step 1202). In some embodiments, the PUSCH transmit power level $P_{PUSCH,c}(i)$ for the wireless device 12 for PUSCH transmission in subframe i for the serving cell c is given by:

$$P_{PUSCH,c}(i) = \min\left\{\begin{array}{l}P_{CMAX,c}(i) - \sum_c \cdot \hat{P}_{PUCCH,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i)\end{array}\right\}[dBm]$$

wherein $\hat{P}_{PUCCH,c}(i)$ could also be zero assuming that there are no ongoing PUCCH transmissions. Another alternative is that PUSCH transmission on the MeNB link (link k) only considers PUCCH transmission on the MeNB link, e.g. PUSCH transmissions on the MeNB link only consider PUCCH transmissions on the MeNB link. The same may be true for the SeNB link.

The process of FIG. 30 and the equation above do not address overlap between subframe i of the one link with subframe (i−1) of the other link. Rather, only the PUCCH and PUSCH in subframe i of the same link are considered. In the equation above, the first term in the minimization function indicates that the PUCCH has priority over PUSCH. The PUSCH transmit power is at most what is left over after PUCCH transmission. The second term is the calculated natural, or conventional, PUSCH transmit power level, which is calculated according to the needs of PUSCH itself. Taking the minimum of these terms says, in effect, that if the natural PUSCH power is low, then the natural PUSCH power will be used. Otherwise, if the natural PUSCH power is high, then the PUSCH transmit power will be capped at the amount of power remaining after allocating power to the PUCCH transmission. The process of FIG. 30 is particularly beneficial when there is no overlap with an earlier subframe (i−1) of the other link.

Figure 31:
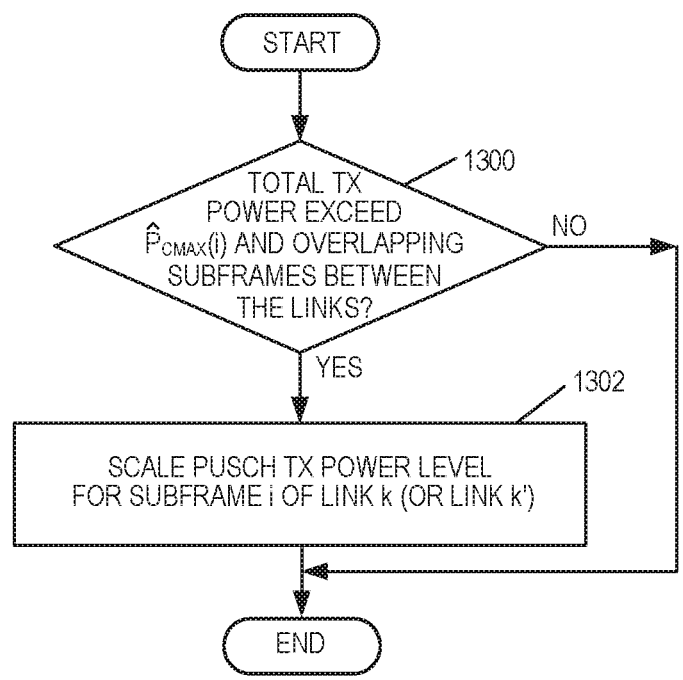
FIG. 31 illustrates a process for determining PUSCH transmit power level by power scaling across all carriers and links according to some embodiments of the present disclosure.

In some embodiments, power scaling across all carriers and links is provided for dynamic configuration. As illustrated in FIG. 31, in some embodiments, if the total transmit power of the wireless device 12 would exceed $\hat{P}_{CMAX}(i)$ and there will be an overlapping transmission in time from the subframe i−1 on one link to subframe i of the other link (step 1300), the wireless device 12 scales the PUSCH transmit power level for subframe i of the other link (step 1302). More specifically, in some embodiments, if the total transmit power of the wireless device 12 would exceed $\hat{P}_{CMAX}(i)$ and there will be an overlapping transmission in time from the subframe i−1 on the SeNB link to subframe i on the MeNB link, the wireless device 12 scales $\hat{P}_{PUSCH,c}(i)$ for the serving cell c on the MeNB link (link k) in subframe i such that the following condition is satisfied:

$$\sum_c w(i) \cdot \hat{P}_{PUSCH,c}(i) \le$$

-continued $$\left(\left(\hat{P}_{CMAX}(i) - \sum_c \hat{P}_{PUSCH,c,SeNB}(i-1) - \hat{P}_{PUCCH,SeNB}(i-1)\right) - \sum_c \cdot \hat{P}_{PUCCH,c}(i)\right)$$

Otherwise, if there will be an overlapping transmission in time from the subframe i−1 on the MeNB link to subframe i on the SeNB link, the wireless device 12 scales $\hat{P}_{PUSCH,c,SeNB}(i)$ for the serving cell c on the MeNB link (link k) in subframe i such that the following condition is satisfied:

$$\sum_c w(i) \cdot \hat{P}_{PUSCH,c}(i) \leq \left(\left(\hat{P}_{CMAX}(i) - \sum_c \hat{P}_{PUSCH,c,MeNB}(i-1) - \hat{P}_{PUCCH,MeNB}(i-1)\right) - \sum_c \cdot \hat{P}_{PUCCH,c}(i)\right)$$

This scaling combines the two considerations from above, namely: (a) overlap between subframe i on one link with subframe (i−1) on the other link and (b) need of PUCCH in subframe i. In these scaling embodiments, in the event of insufficient power, PUSCH has lower priority, and the PUSCH transmit power level is scaled so that both (a) and (b) are taken into consideration. Also, note that in the two equations above illustrating the scaling, the PUCCH power level is from earlier PUCCH power level calculations. Hence, if in PUCCH power calculation the UE determines that there is no more power left over after PUCCH power calculation, then the weights w(i) of PUSCH can be set to zero. In this case, PUSCH gets no power and is essentially dropped.

The scaling equations can also be explained in the following manner. The right-hand side of the two preceding equations is a calculation of transmit power left over after subtracting the transmit power needs of subframe i−1 of the other link and the PUCCH transmit power needs of subframe i of the link from the maximum allowable transmit power. On the left-hand sides of the equations, the natural power level of PUSCH (e.g., calculated as the 10 log 10( ) term in the PUSCH power control description above) is scaled down by applying weights w(i) so that it does not exceed the value calculated on the right-hand side of the equation.

The above scaling embodiments can also be combined with a configurable maximum transmission power value per link, e.g., the power cannot exceed this power independent from if there is something transmitted or not on the other link. Alternatively, the scaling embodiments does consider if there is something transmitted or not on the other link, such that the maximum power limitation is only applied in case the UE may exceed the maximum transmission power shared by two links.

In the embodiments above, it was assumed that for any given instant $\hat{P}_{MeNB,max} + \hat{P}_{SeNB,max} = \hat{P}_{CMAX}(i)$. Alternatively, the maximum transmit power levels $P_{MeNB,max}$ and $\hat{P}_{SeNB,max}$ are not defined such that the sum of maximum power must be equal to $\hat{P}_{CMAX}$. For instance, the wireless device 12 could first determine the transmission power for the MeNB link and the SeNB link separately, assuming non-existence of the other link(s). Then, the wireless device 12 could perform power scaling over two (or more) simultaneous links if the total power for the two (or more) links determined in the previous step exceeds the maximum allowed power $\hat{P}_{CMAX}(i)$.

Figure 32:
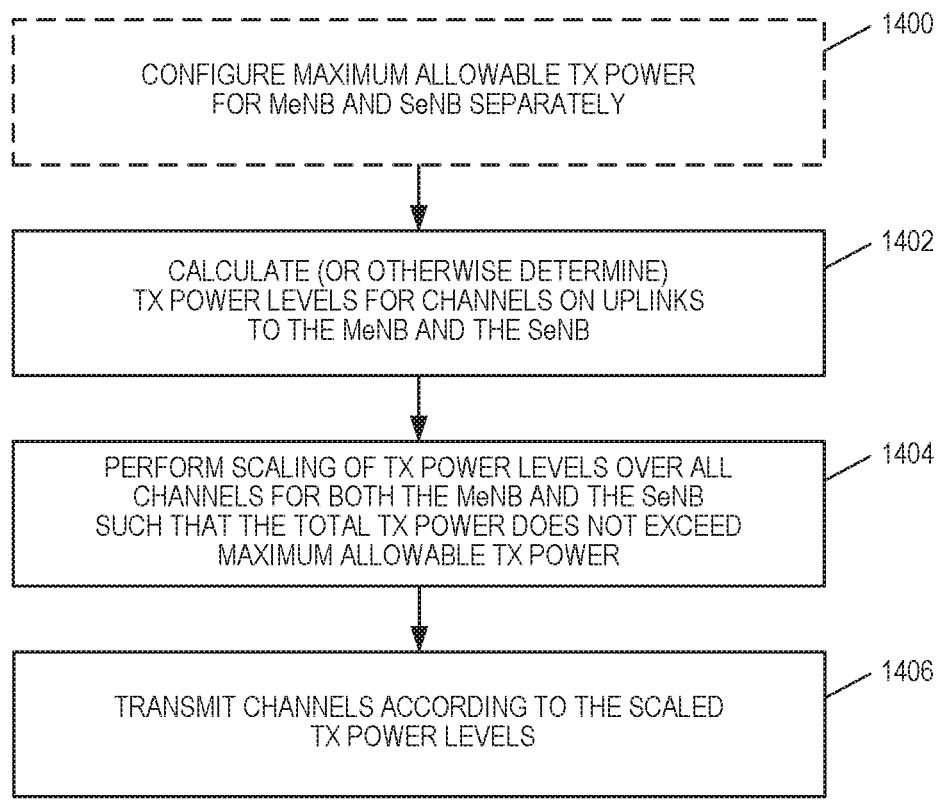
FIG. 32 is a flow chart that illustrates a procedure that utilizes a power scaling scheme according to some embodiments of the present disclosure.

FIG. 32 illustrates one embodiment of a procedure that utilizes such a scaling scheme. As illustrated, the wireless device 12 configures the maximum (allowable) transmit power levels $\hat{P}_{MeNB,max}$ and $\hat{P}_{SeNB,max}$ separately (step 1400). In this embodiment, the sum of the configured maximum transmit power levels $\hat{P}_{MeNB,max}$ and $\hat{P}_{SeNB,max}$ could exceed the maximum allowable transmission power level $\hat{P}_{CMAX}$ for the wireless device 12. However, one special case is that both $\hat{P}_{MeNB,max}$ and $\hat{P}_{SeNB,max}$ are equal to $\hat{P}_{CMAX}$.

Note that the relative priority between the PUCCH on the MeNB link and the PUCCH on the SeNB link can be set by the relative values of $\hat{P}_{MeNB,max}$ and $\hat{P}_{SeNB,max}$. In one example, $\hat{P}_{MeNB,max} = \hat{P}_{CMAX}$, $\hat{P}_{SeNB,max} = \hat{P}_{CMAX}$. In this case, the wireless device 12 determines the power of the uplink channel(s) on the MeNB link (as discussed below in step 1402) without being limited by the SeNB link and determines the power of the uplink channel(s) on the SeNB link (as discussed below in step 1402) without being limited by the MeNB link. The wireless device 12 then scales the power of uplink channels on the MeNB link and the SeNB link equally in step 1404 (discussed below) if $\hat{P}_{CMAX}$ will be exceed by the sum without scaling.

In another example, $\hat{P}_{MeNB,max} = \hat{P}_{CMAX}$, $\hat{P}_{SeNB,max} = 0.5 \times \hat{P}_{CMAX}$. In this case, in step 1402 discussed below, the wireless device 12 determines the transmit power for the uplink channels on the MeNB link without being limited by the SeNB link, whereas the wireless device 12 determines the transmit power for the uplink channels on the SeNB link with the limitation that maximum total power across the SeNB channels cannot exceed $0.5 \times \hat{P}_{CMAX}$. This biases power allocation in favor of the MeNB uplink channels if equal scaling is applied in step 1404 (i.e., $w_{MeNB}(i) = w_{SeNB}(i)$).

After configuring the maximum transmit power levels $\hat{P}_{MeNB,max}$ and $\hat{P}_{SeNB,max}$, the wireless device 12 calculates, or otherwise determines, the transmit power levels for the uplink channels to be transmitted on the MeNB link and the SeNB link (step 1402). In some embodiments, for each link, the calculation of the transmit power for the corresponding uplink channels could reuse the principles for LTE Release 11 Carrier Aggregation (CA) including channel prioritization as well as the power scaling. Notably, as discussed above, in some embodiments, the relative priority between the PUCCH on the MeNB link and the PUCCH on the SeNB link can be set by the relative values of $\hat{P}_{MeNB,max}$ and $\hat{P}_{SeNB,max}$. This relative priority may be taken into consideration when calculating the transmit power for the uplink channels, as discussed above.

The wireless device 12 performs scaling of the transmit power levels over all (active) channels for both of the links such that the total transmit power does not exceed the maximum allowable transmit power level $\hat{P}_{CMAX}(i)$ (step 1404). In some embodiments, the wireless device 12 performs scaling over all the active channels for both the MeNB link and the SeNB link so that the total power does not exceed $\hat{P}_{CMAX}$ according to:

$$\sum_c w_{MeNB}(i) \cdot \hat{P}_{MeNB,c}(i) + \sum_c w_{SeNB}(i) \cdot \hat{P}_{SeNB,c}(i) \leq \hat{P}_{CMAX}(i)$$

where $w_{MeNB}(i)$ and $w_{SeNB}(i)$ are the scaling factors for the MeNB link and the SeNB link, respectively, and $0 \le w_{MeNB}(i) \le 1, 0 \le w_{SeNB}(i) \le 1$. The power scaling for the MeNB link and the SeNB link could either be same or different. In some embodiments, the ratio of scaling factors for the MeNB link and the SeNB link are signalled to the wireless device 12. In other embodiments, the scaling factors are the same and determined by the wireless device 12. Lastly, the wireless device 12 transmits all channels for both the MeNB link and the SeNB link according to the scaled transmit power levels (step 1406).

The process of FIG. 32 can be combined with either static or semi-statically defined $\hat{P}_{MeNB,max}$ and $\hat{P}_{SeNB,max}$. Handling of unsynchronized subframes between the MeNB link and the SeNB link can be handled by considering overlapping in both slots or only considering overlapping in first slot.

Figure 33:
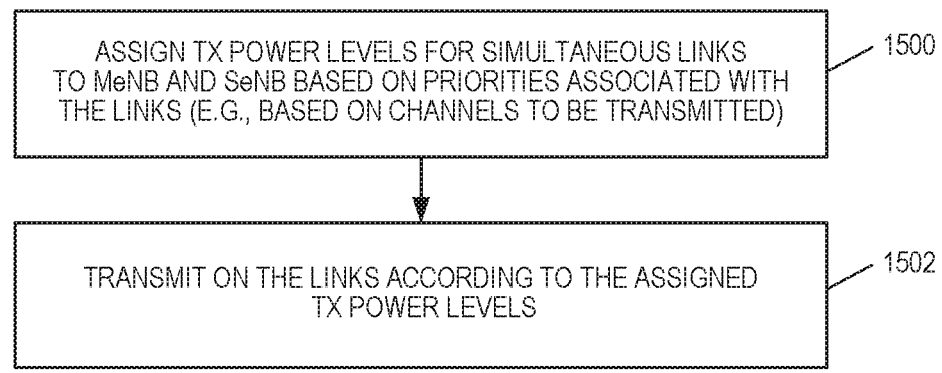
FIG. 33 is a flow chart that illustrates one embodiment of using the this prioritization of uplink channels to assign the maximum transmit power levels for the MeNB and SeNB links according to some embodiments of the present disclosure.

Thus far, the embodiments described have related to static, semi-static, and dynamic power level configuration when the wireless device 12 is operating with dual connectivity. In other embodiments, the maximum transmit power levels $\hat{P}_{MeNB,max}$ and $\hat{P}_{SeNB,max}$ are assigned based on priorities assigned to the links or to the uplink channels transmitted on the links according to some embodiments of the present disclosure. In this regarding, in some embodiments, the following uplink transmission priorities, p, are assigned between the different types of uplink channels that can be transmitted on the MeNB link and the SeNB link:
  Physical Random Access Channel (PRACH) (p=1)
  PUCCH with Uplink Control Information (UCI) (p=2)
  PUSCH with UCI (p=3)
  PUSCH without UCI (p=4)
  SRS (p=5)
Based on these priorities, the maximum transmit power levels $\hat{P}_{MeNB,max}$ and $\hat{P}_{SeNB,max}$ can be, for example, assigned according to the following:
  Share power equally if the transmissions over the two links have same priority level p;
  Give full power to a link with higher priority level p, then give the rest to transmission of next priority;
  Drop SRS if it overlaps the higher priority channels. Notably, SRS may not be dropped all the time. For example, if required SRS power is less than the guaranteed power level of the link, then SRS may not be dropped.
For two transmissions with UCI, the prioritization can further separate out UCI elements. For example, Hybrid Automatic Repeat Request (HARQ) Acknowledgements/Non-Acknowledgements (ACKs/NACKs), or HARQ-ACK can be treated with higher priority than other UCI elements (Channel State Information (CSI)). In this case, the modified priority (high to low) can be defined as:
  PRACH (p=1)
  PUCCH with HARQ-ACK (p=2)
  PUSCH with HARQ-ACK (p=3)
  PUSCH with CSI only (i.e., without HARQ-ACK) (p=4)
  PUCCH with CSI only (i.e., without HARQ-ACK) (p=5)
  SRS (p=6)
  PUSCH with UCI carries aperiodic CSI reports triggered by eNB FIG. 33 is a flow chart that illustrates one embodiment of using the prioritization of uplink channels to assign the maximum transmit power levels $P_{MeNB,max}$ and $P_{SeNB,max}$ according to some embodiments of the present disclosure. As illustrated, the wireless device 12 assigns the maximum transmit power levels $P_{MeNB,max}$ and $P_{SeNB,max}$ for the links based on priorities associated with the links (step 1500). As discussed above, the priorities associated with the links is, at least in some embodiments, based on priorities assigned to, or otherwise associated with, the uplink channels to be transmitted on the links, which are referred to herein as active uplink channels for the links. The priorities may be assigned to the uplink channels based on the channel types or the information, or content, of the channels. The wireless device 12 transmits uplink transmissions, including the active uplink channels, on the links according to the assigned maximum transmit power levels $\hat{P}_{MeNB,max}$ and $\hat{P}_{SeNB,max}$ (step 1502).

Figure 34:
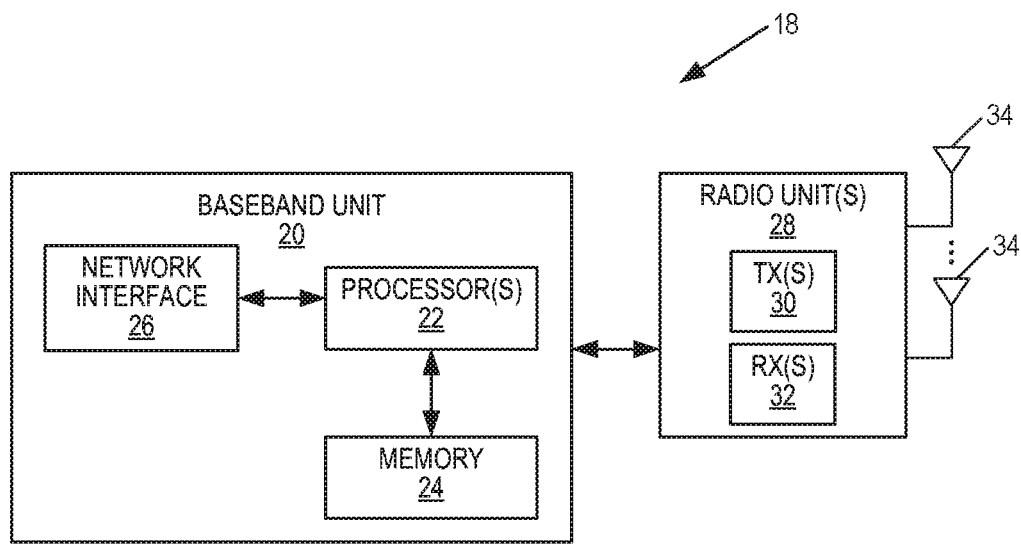
FIG. 34 is a block diagram of a base station according to some embodiments of the present disclosure.

FIG. 34 is a block diagram of a base station 18 according to some embodiments of the present disclosure. As illustrated, the base station 18 includes a baseband unit 20 including one or more processors 22 (e.g., Central Processing Unit(s) (CPU(s)), Application Specific Integrated Circuit(s) (ASIC(s)), and/or Field Programmable Gate Array(s) (FPGA(s))), memory 24, and a network interface 26 and one or more radio units 28 including one or more transmitters 30 and one or more receivers 32 coupled to one or more antennas 34. In some embodiments, the functionality of the base station 18 described herein is implemented in software that is stored by the memory 24 and executed by the processor(s) 22, whereby the base station 18 operates according to any of the embodiments described herein.

In some embodiments, a computer program including instructions which, when executed by at least one processor, causes the at least one processor to carry out the functionality of the base station 18 according to any of the embodiments described herein is provided. In one embodiment, a carrier containing the aforementioned computer program product is provided. The carrier is one of an electronic signal, an optical signal, a radio signal, or a computer readable storage medium (e.g., a non-transitory computer readable medium such as the memory 24).

Figure 35:
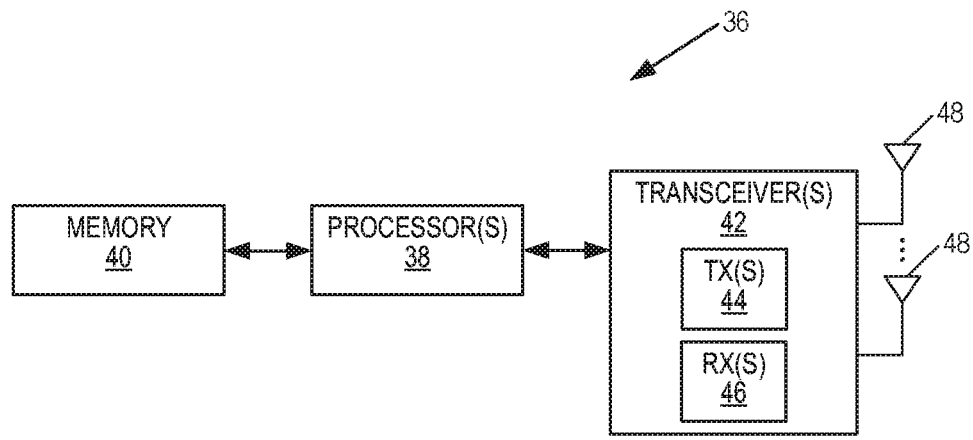
FIG. 35 is a block diagram of a wireless device according to some embodiments of the present disclosure.

FIG. 35 is a block diagram of a wireless device 36 according to some embodiments of the present disclosure. As illustrated, the wireless device 36 includes one or more processors 38 (e.g., CPU(s), ASIC(s), and/or FPGA(s)), memory 40, and one or more transceivers 42 including one or more transmitters 44 and one or more receivers 46 coupled to one or more antennas 48. In some embodiments, the functionality of the wireless device 36 described herein is implemented in software stored in the memory 40 and executed by the processor(s) 38, whereby the wireless device 36 operates according to any of the embodiments described herein.

In some embodiments, a computer program including instructions which, when executed by at least one processor, causes the at least one processor to carry out the functionality of the wireless device 12 according to any of the embodiments described herein is provided. In one embodiment, a carrier containing the aforementioned computer program product is provided. The carrier is one of an electronic signal, an optical signal, a radio signal, or a computer readable storage medium (e.g., a non-transitory computer readable medium such as the memory 40).

Figure 36:
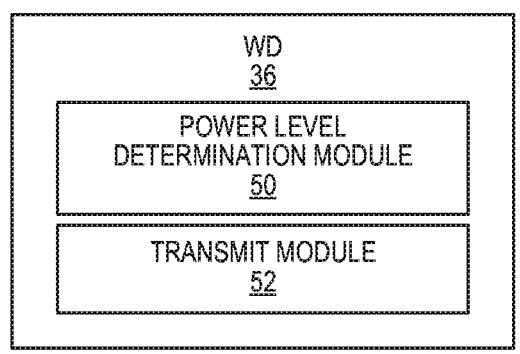
FIG. 36 is a block diagram of a wireless device according to some other embodiments of the present disclosure.

FIG. 36 is a block diagram that illustrates the wireless device 36 according to some other embodiments of the present disclosure. As illustrated, the wireless device 36 includes a power level determination module 50 and a transmit module 52, each of which is implemented in software. The power level determination module 50 operates to determine $\hat{P}_{MeNB,max}$ and $\hat{P}_{SeNB,max}$ according to any of the embodiments described herein. The transmit module 52 operates to transmit on the links k and k' (via an associated transmitter(s) of the wireless device 36, which are not shown in FIG. 36) in accordance with the determined values for $\hat{P}_{MeNB,max}$ and $\hat{P}_{SeNB,max}$.

In one example embodiment, a method is performed at a UE for calculating power for a first link for a first subframe. The method comprises determining whether there is an uplink transmission on a second link overlapping a first time slot of the first subframe; if a uplink transmission exists on the second link, calculating power $\hat{P}^k$ (i−1)=min ($\hat{P}_{SL}^k(i)$, $\hat{P}_{CMAX}(i)-\hat{P}_{used}^{k'}(i-1)$), where $\hat{P}_{CMAX}(i)$ refers to the linear value of the UE total configured maximum output power level $P_{CMAX}$, $P_{used}^{k'}(i-1)$ refers to the power level used by the other link k' that overlaps the first slot of the subframe i; $\hat{P}_{SL}^k(i)$ is the calculated linear power value for the link k assuming link k is the single link that the UE has uplink transmission in the entire duration of subframe i (i.e., assuming non-overlap with link k'). The method further comprises determining whether there is an uplink transmission on the second link overlapping a second slot of the first subframe. If so, the method comprises calculating a power $\hat{P}^k(i)$ for a second subframe subsequent to the first subframe as if subframe i of the link k is aligned in subframe boundary with the overlapping subframe of link k'.

The following acronyms are used throughout this disclosure.
μs Microsecond
ACK Acknowledgement
AL Aggregation Level
ASIC Application Specific Integrated Circuit
CA Carrier Aggregation
CC Component Carrier
CCE Control Channel Element
CFI Control Format Indicator
CIF Carrier Indicator Field
CPU Central Processing Unit
CRC Cyclic Redundancy Check
C-RNTI Cell Radio Network Temporary Identifier
CRS Common Reference Symbol
CSI Channel State Information
dB Decibel
dBm Milli-Decibels
DCI Downlink Control Information
DFT Discrete Fourier Transform
DL PCC Downlink Primary Component Carrier
DTX Discontinuous Transmission
eNB Enhanced or Evolved Node B
ePDCCH Enhanced Physical Downlink Control Channel
FDD Frequency Division Duplex
FPGA Field Programmable Gate Array
GNSS Global Navigation Satellite System
HARQ Hybrid Automatic Repeat Request
LTE Long Term Evolution
MAC Medium Access Control
MCG Master Cell Group
MeNB Master Enhanced or Evolved Node B
MHz Megahertz
ms Millisecond
NACK Non-Acknowledgement
OFDM Orthogonal Frequency Division Multiplexing
PCell Primary Cell
PDCCH Physical Downlink Control Channel
PDSCH Physical Downlink Shared Channel
PRACH Physical Random Access Channel
PRB Physical Resource Block
PUCCH Physical Uplink Control Channel
PUSCH Physical Uplink Shared Channel
QCI Quality of Service Class Indicator
QPSK Quadrature Phase Shift Keying
RB Resource Block
REG Resource Element Group
RLC Radio Link Control
RNTI Radio Network Temporary Identifier
RRC Radio Resource Control
RSRP Reference Signal Received Power
SCC Secondary Component Carrier
SCG Secondary Cell Group
SeNB Secondary Enhanced or Evolved Node B
SRS Sounding Reference Signal
TAG Timing Advance Group
TDD Time Division Duplex
TP Transmission Point
TPC Transmit Power Control
TS Technical Specification
UCI Uplink Control Information
UE User Equipment
UL Uplink
UL PCC Uplink Primary Component Carrier
VRB Virtual Resource Block Those skilled in the art will recognize improvements and modifications to the embodiments of the present disclosure. All such improvements and modifications are considered within the scope of the concepts disclosed herein and the claims that follow.

What is claimed is:

1. A method of operating a wireless device having a first link to a first wireless network node in a wireless communications network and a second link to a second wireless network node in the wireless communications network, the method comprising:
receiving, via Radio Resource Control (RRC) signaling, a configured maximum transmit power level for the first link;
determining a maximum transmit power level for the second link from the wireless device to the second wireless network node, where the maximum transmit power level for the second link is a function of a maximum allowable transmit power level and a transmission power of at least one of subframe (i−1) and subframe i of the first link, the transmission power of the at least one of subframe (i−1) and subframe i of the first link being limited by the configured maximum transmit power level for the first link; and
transmitting on the second link in subframe j according to the maximum transmit power level for the second link;
wherein the first link and the second link are simultaneous dual-connectivity links, each link being configured to support a plurality of aggregated carriers and a plurality of uplink channel types including a control channel and/or a random access channel, and
wherein subframe (i−1) and subframe i of the first link overlap with subframe j of the second link.

2. The method of claim 1 wherein a sum of a maximum transmit power level for the first link from the wireless device to the first wireless network node and the maximum transmit power level for the second link is less than or equal to the maximum allowable transmit power level.

3. The method of claim 1 wherein the maximum allowable transmit power level varies from one subframe to another subframe.

4. The method of claim 1 wherein the first and second links have asynchronous overlapping transmissions, further comprising:
determining whether a total transmit power across a subframe of the first link and an overlapping subframe of the second link exceeds the maximum allowable transmit power level for the subframe of the first link; and if the total transmit power across the subframe of the first link and the overlapping subframe of the second link exceeds the maximum allowable transmit power level for the subframe of the first link, scaling a transmit power level for an uplink channel or signal in the subframe of the first link such that, after scaling, the total transmit power across the subframe of the first link and the overlapping subframe of the second link does not exceed the maximum allowable transmit power level for the subframe of the first link.

5. The method of claim 1 wherein the maximum transmit power level for the second link is the function of the maximum allowable transmit power level and the transmission power of subframe (i−1) of the first link.

6. The method of claim 5 further comprising:
determining a maximum transmit power level for subframe i of the first link from the wireless device to the first wireless network node as the function of the maximum allowable transmit power level and the transmission power of subframe j of the second link; and
transmitting on the first link in subframe i according to the maximum transmit power level for subframe i.

7. The method of claim 1 wherein the maximum transmit power level for the second link is the function of the maximum allowable transmit power level and the transmission power of subframe i of the first link.

8. The method of claim 1 wherein the maximum transmit power level for the second link is the function of the maximum allowable transmit power level, the transmission power of subframe (i−1) of the first link, and the transmission power of subframe i of the first link.

9. The method of claim 1, further comprising:
determining a type of uplink channel to be transmitted in a first cell of the second link using subframe (j) and a type of uplink channel to be transmitted in a second cell of the second link using subframe (j); and
assigning transmission priorities to the uplink channels to be transmitted over the second link based on the determined uplink channel types.

10. The method of claim 9, further comprising:
determining a type of uplink channel to be transmitted in a first cell of the first link using subframes (i) and (i−1) and a type of uplink channel to be transmitted in a second cell of the first link using subframes (i) and (i−1); and
assigning transmission priorities to the uplink channels to be transmitted over the first link based on the determined uplink channel types.

11. A method of operating a wireless device having a first link to a first wireless network node in a wireless communications network and a second link to a second wireless network node in the wireless communications network, the method comprising:
determining a first maximum transmit power level for the first link from the wireless device to the first wireless network node and a second maximum transmit power level for the second link from the wireless device to the second wireless network node, where each of the first maximum transmit power level and the second maximum transmit power level is a function of a maximum allowable transmit power level and the first maximum transmit power level and the second maximum transmit power level are semi-statically defined, and a sum of the first maximum transmit power level and the second maximum transmit power level is greater than the maximum allowable power; and transmitting on the first link and the second link in subframe j according to the first maximum transmit power level and the second maximum transmit power level, respectively;

wherein the first link and the second link are simultaneous dual-connectivity links, each link being configured to support a plurality of aggregated carriers and a plurality of uplink channel types including a control channel and/or a random access channel, and wherein subframe (i−1) and subframe i of the first link overlap with subframe j of the second link.

12. The method of claim 11 wherein determining the first maximum transmit power level and the second maximum transmit power level comprises:
for a particular subframe of the first link, determining the first maximum transmit power level for the particular subframe of the first link according to a semi-static definition of the first maximum transmit power level as a first fraction of the maximum allowable transmit power for the particular subframe of the first link; and
for a particular subframe of the second link that is either synchronous transmission with the particular subframe of the first link or asynchronous partially overlapping transmission with the particular subframe of the first link, determining the second maximum transmit power level for the particular subframe of the second link according to a semi-static definition of the second maximum transmit power level as a second fraction of the maximum allowable transmit power for the particular subframe of the second link.

13. The method of claim 12 wherein the sum of the first fraction and the second fraction is greater than 1.

14. The method of claim 11 wherein transmitting on the first link and the second link according to the first maximum transmit power level and the second maximum transmit power level, respectively, comprises transmitting on the first link according to the first maximum transmit power level, if the calculated transmit power level for the first link is greater than the first maximum transmit power level.

15. A wireless device having a first link to a first wireless network node in a wireless communications network and a second link to a second wireless network node in the wireless communications network, comprising:
a transmitter;
at least one processor; and
memory containing software instructions executable by the at least one processor whereby the wireless device is operative to:
receive, via Radio Resource Control (RRC) signaling, a configured maximum transmit power level for the first link;
determine a maximum transmit power level for the second link from the wireless device to the second wireless network node where the maximum transmit power level is a function of a maximum allowable transmit power level and a transmission power of at least one of subframe (i−1) and subframe i of the first link, the transmission power of the at least one of subframe (i−1) and subframe i of the first link being limited by the configured maximum transmit power level for the first link; and
transmit, via the transmitter, on the second link according to the maximum transmit power level;
wherein the first link and the second link are simultaneous dual-connectivity links, each link being configured to support a plurality of aggregated carriers and a plurality of uplink channel types including a control channel and/or a random access channel; and wherein subframe (i−1) and subframe i of the first link overlap with subframe j of the second link.

* * * * *

UNITED STATES PATENT AND TRADEMARK OFFICE
CERTIFICATE OF CORRECTION

PATENT NO. : 10,959,189 B2
APPLICATION NO. : 14/758734
DATED : March 23, 2021
INVENTOR(S) : Blankenship et al.

Page 1 of 1

It is certified that error appears in the above-identified patent and that said Letters Patent is hereby corrected as shown below:

In the Specification

In Column 1, Line 64, delete "(CRS)," and insert -- (CRSs), --, therefor.

In Column 2, Line 64, delete "ratematched" and insert -- rate-matched --, therefor.

In Column 7, Lines 38-39, delete "compensation." and insert -- compensation, --, therefor.

In Column 8, Lines 62, delete "PUCCH/physical" and insert -- PUSCH/physical --, therefor.

In Column 14, Line 48, delete "illustrate" and insert -- illustrates --, therefor.

In Column 16, Line 5, delete "the this" and insert -- the --, therefor.

In Column 16, Line 60, delete "wireless" and insert -- wireless device 12 --, therefor.

In Column 17, Line 21, delete "$\hat{P}_{MeNB,max}+\hat{P}_{SeNB,max}=\hat{P}_{CMAX}(i)$" and insert -- $\hat{P}_{MeNB,\max} + \hat{P}_{SeNB,\max} = \hat{P}_{CMAX}(i)$. --, therefor.

In Column 17, Lines 66-67, delete "$\hat{P}_{MeNB,\max} = \hat{P}_{SeNB,\max} = 5 \times \hat{P}_{CMAX}(i)$." and insert -- $\hat{P}_{MeNB,\max} = \hat{P}_{SeNB,\max} = 0.5 \times \hat{P}_{CMAX}(i)$. --, therefor.

In Column 18, Line 23, delete "$\gamma_{MeNB}$" and insert -- $\gamma_{SeNB}$ --, therefor.

In Column 19, Line 43, delete "$\gamma_{MeNB}$," and insert -- $\gamma_{SeNB}$ --, therefor.

In Column 31, Line 48, delete "10 log 10( )" and insert -- 10log10( ) --, therefor.

In Column 33, Line 32, delete "(p=5)" and insert -- "(p=5). --, therefor.

Signed and Sealed this
Twenty-first Day of December, 2021

Drew Hirshfeld
*Performing the Functions and Duties of the*
*Under Secretary of Commerce for Intellectual Property and*
*Director of the United States Patent and Trademark Office*